(12) United States Patent
Zhang et al.

(10) Patent No.: US 11,356,219 B2
(45) Date of Patent: *Jun. 7, 2022

(54) RESOURCE ALLOCATION INDICATION INFORMATION COMMUNICATION METHOD, APPARATUS AND SYSTEM

(71) Applicant: HUAWEI TECHNOLOGIES CO., LTD., Guangdong (CN)

(72) Inventors: Xu Zhang, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,935

(22) Filed: May 27, 2020

(65) Prior Publication Data

US 2020/0287675 A1 Sep. 10, 2020

Related U.S. Application Data

(63) Continuation of application No. 16/543,200, filed on Aug. 16, 2019, now Pat. No. 10,708,014, which is a (Continued)

(30) Foreign Application Priority Data

Nov. 10, 2017 (CN) .......................... 201711107915.2
Jan. 19, 2018 (CN) .......................... 201810055142.6

(51) Int. Cl.
*H04W 4/00* (2018.01)
*H04L 5/00* (2006.01)
*H04W 72/04* (2009.01)

(52) U.S. Cl.
CPC .......... *H04L 5/0044* (2013.01); *H04L 5/0007* (2013.01); *H04L 5/0053* (2013.01);
(Continued)

(58) Field of Classification Search
CPC ....... H04L 5/004; H04L 5/007; H04L 5/0053; H04L 5/0092; H04W 72/0453; H04W 72/042
See application file for complete search history.

(56) References Cited

U.S. PATENT DOCUMENTS 9,276,710 B2 3/2016 Damnjanovic et al.
2011/0274076 A1 11/2011 Classon et al.
(Continued)

FOREIGN PATENT DOCUMENTS

CN 101488832 A 7/2009
CN 101932098 A 12/2010
(Continued)

OTHER PUBLICATIONS

3GPP TS 38.211 V1 .0.0 (Sep. 2017);3rd Generation Partnership Project;Technical Specification Group Radio Access Network;NR;Physical channels and rnodulation(Release 15), total 37 pages.
(Continued)

*Primary Examiner* — Abdelnabi O Musa
(74) *Attorney, Agent, or Firm* — Fish & Richardson P.C.

(57) ABSTRACT

In the method of present application, a terminal device obtains resource indication information. The resource indication information indicates frequency domain resources of a data channel of a terminal device. The resource indication information comprises S bits, where S is a positive integer. The terminal device determines the frequency domain resources of the data channel of the terminal device based on the resource indication information.

21 Claims, 8 Drawing Sheets

Related U.S. Application Data continuation of application No. 16/205,365, filed on Nov. 30, 2018, now Pat. No. 10,469,221, which is a continuation of application No. PCT/CN2018/095899, filed on Jul. 17, 2018.

(52) U.S. Cl.
CPC ....... *H04L 5/0092* (2013.01); *H04W 72/0453* (2013.01); *H04W 72/042* (2013.01)

(56) References Cited

U.S. PATENT DOCUMENTS

| | | | |
|---|---|---|---|
| 2012/0287848 A1 | 11/2012 | Kim et al. | |
| 2012/0294250 A1 | 11/2012 | Pan et al. | |
| 2013/0083753 A1* | 4/2013 | Lee | H04L 1/0026 370/329 |
| 2014/0348089 A1 | 11/2014 | Lv et al. | |
| 2015/0085816 A1 | 3/2015 | Roh et al. | |
| 2015/0110056 A1 | 4/2015 | Wang et al. | |
| 2016/0044665 A1 | 2/2016 | Novlan et al. | |
| 2016/0088594 A1 | 3/2016 | Xiong et al. | |
| 2017/0188350 A1 | 6/2017 | Kim et al. | |
| 2017/0215170 A1* | 7/2017 | Islam | H04L 27/2601 |
| 2017/0359805 A1 | 12/2017 | You et al. | |
| 2017/0367074 A1 | 12/2017 | Zhang et al. | |
| 2018/0006763 A1 | 1/2018 | Kim et al. | |
| 2018/0049203 A1* | 2/2018 | Xue | H04L 5/0053 |
| 2018/0084429 A1 | 3/2018 | Guo et al. | |
| 2018/0146456 A1* | 5/2018 | Zhou | H04W 72/04 |
| 2018/0146462 A1 | 5/2018 | Soldati et al. | |
| 2018/0324773 A1* | 11/2018 | Fu | H04L 5/0094 |
| 2018/0368168 A1* | 12/2018 | Jung | H04W 72/1289 |
| 2019/0037508 A1* | 1/2019 | Sun | H04W 48/12 |
| 2019/0045490 A1* | 2/2019 | Davydov | H04W 28/22 |
| 2019/0158326 A1* | 5/2019 | Liao | H04L 5/0048 |

FOREIGN PATENT DOCUMENTS

| | | |
|---|---|---|
| CN | 102014444 A | 4/2011 |
| CN | 102487548 A | 6/2012 |
| CN | 102726109 A | 10/2012 |
| CN | 103220077 A | 7/2013 |
| CN | 103945538 A | 7/2014 |
| CN | 104937876 A | 9/2015 |
| CN | 106162913 A | 11/2016 |
| CN | 106465318 A | 11/2016 |
| CN | 106211334 A | 12/2016 |
| CN | 108882376 A | 1/2020 |
| EP | 324516 A1 | 11/2017 |
| EP | 3242516 A1 | 11/2017 |
| EP | 3297353 A1 | 3/2018 |
| JP | 2014060759 A | 4/2014 |
| RU | 2585656 C1 | 6/2016 |
| WO | 2011084822 A1 | 7/2011 |
| WO | 2016043906 A1 | 3/2016 |
| WO | 2016080772 A1 | 5/2016 |
| WO | 2016122268 A1 | 8/2016 |
| WO | 2017000248 A1 | 1/2017 |

OTHER PUBLICATIONS

3GPP TS 38.213 V1 .0.0 (Sep. 2017);3rd Generation Partnership Project;Technical Specification Group Radio Access Network;NR;Physical layer procedures for control{Release 15),total 16 pages.

3GPP TS 38.214 V1 0.0 (Sep. 2017);3rd Generation Partnership Project;Technical Specification Group Radio Access Network;NR;Physical layer procedures for data (Release 15),total 32 pages.

Catt, PDSCH and PUSCH resource allocation\3GPP TSG RAN WG1 Meeting 90bis R1-1717833,Prague, CZ, Oct. 9-13, 2017,total 9 pages.

Extended European Search Report issued in European Application No. 18876464.1 dated Mar. 5, 2020, 9 pages.

MediaTek Inc.,"Design Details on Beam Failure Recovery",3GPP TSG RAN WG1 Meeting #90bis R1-1718334, Prague, Czechia, Oct. 9-13, 2017,total 8 pages.

Nokia et al., "On wider band aspects of NR," 3GPP TSG-RAN WG1 Meeting NR#2, R1-1710883; Wingdao, China, XP051304396, Jun. 27-30, 2017, 6 pages.

Office Action issued in Chinese Application No. 201810585946.7 dated May 21, 2019, 9 pages (with English translation).

Extended European Search Report issued in European Application No. 21150048.3 dated Apr. 22, 2021, 9 pages.

Huawei, HiSilicon, "Overview of bandwidth part, CA, and DC operation including SRS switching," 3GPP TSG RAN WG1 adhoc_NR_AH_1709, R1-1715425, Nagoya, Japan, Sep. 18-21, 2017, 17 pages.

InterDigital, Inc., "On frequency-domain resource allocation for NR," 3GPP TSG RAN WG1 #90, R1-1714159, Prague, Czech Republic, Aug. 21-25, 2017, 8 pages.

LG Electronics, "Discussion on frequency-domain resource allocation," 3GPP TSG RAN WG1 adhoc_NR_AH_1706 R1-1710323, Qingdao, P.R. China, Jun. 27-30, 2017, 8 pages.

Office Action issued in Japanese Application No. 2020-525881 dated Jul. 13, 2021, 16 pages (with English translation).

Samsung, "Wider Bandwidth Operations," 3GPP TSG RAN WG1 #90, R1-1713654, Prague, Czech Republic, Aug. 21-26, 2017, 12 pages.

Huawei, HiSilicon, "Remaining issues on bandwidth part," 3GPP TSG RAN WG1 Meeting #90bis, R1-1717077, Prague, Czech Republic, Oct. 9-13, 2017, 11 pages.

InterDigital, Inc., "On remaining details of data resource allocation," 3GPP TSG RAN WG1 Meeting 90bis, R1-1718494, Prague, CZ, Oct. 9-13, 2017, 5 pages.

MediaTek Inc., "Summary of Bandwidth Part Operation," 3GPP TSG RAN WG1 Meeting 90bis, R1-1718839, Prague, CZ, Oct. 9-13, 2017, 13 pages.

Office Action issued in Korean Application No. 2020-7014428 dated Sep. 9, 2021, 4 pages (with English translation).

Samsung, "On Bandwidth Part Operation," 3GPP TSG RAN WG1 NR 90bis, R1-1717675, Prague, Czech Republic, Oct. 9-13, 2017, 8 pages.

Office Action issued in Russian Application No. 2020119141/07(032491) dated Oct. 22, 2021, 43 pages (with English translation).

Office Action issued in Japanese Application No. 2020-525881 dated Oct. 26, 2021, 6 pages (with English translation).

* cited by examiner

RESOURCE ALLOCATION INDICATION INFORMATION COMMUNICATION METHOD, APPARATUS AND SYSTEM

CROSS-REFERENCE TO RELATED APPLICATIONS

This application is a continuation of U.S. patent application Ser. No. 16/543,200, filed on Aug. 16, 2019, which is a continuation of U.S. patent application Ser. No. 16/205,365, filed on Nov. 30, 2018, now U.S. Pat. No. 10,469,221, which is a continuation of International Application No. PCT/CN2018/095899, filed on Jul. 17, 2018, which claims priority to Chinese Patent Application No. 201711107915.2, filed on Nov. 10, 2017, and Chinese Patent Application No. 201810055142.6, filed on Jan. 19, 2018. All of the aforementioned patent applications are hereby incorporated by reference in their entireties.

TECHNICAL FIELD

The present disclosure relates to the wireless communication field, and in particular, to configuration of resource block sets in a wireless communication system.

BACKGROUND

In the fifth-generation wireless access system standard New Radio (NR), a unit in a frequency domain is a subcarrier and a unit in a time domain is an orthogonal frequency division multiplexing (OFDM) symbol. A resource element (RE) is a minimum physical resource, including one subcarrier in one OFDM symbol.

Specifically, a network device may configure one or a plurality of uplink/downlink bandwidth parts (BWP) for a terminal device. BWP is a subset of system carrier bandwidth, and the plurality of bandwidth parts may overlap in the frequency domain. A network device may activate one uplink/downlink bandwidth part in the configured bandwidth parts for the terminal device (for example, user equipment (UE)). The network device transmits a physical downlink shared channel (PDSCH) and a physical downlink control channel (PDCCH) to the terminal device in the activated downlink bandwidth part, and the terminal device transmits a physical uplink shared channel (PUSCH) to the network device in the activated uplink bandwidth part.

A plurality of BWPs configured by the network device for one or more terminal devices may overlap in the frequency domain, and a minimum granularity for configuring a BWP in the frequency domain is one resource block (RB), and each RB includes a plurality of subcarriers. Each RB in an overlapped location in a BWP of overlapped BWPs in the frequency domain can only be allocated to one terminal device at most. On such premise, how to efficiently allocate or re-allocate uplink or downlink resources by the network device to the terminal device becomes a technical problem that needs to be resolved.

SUMMARY

The present disclosure relates to a communication method, apparatus, and system, so that a network device can efficiently allocate or re-allocate uplink or downlink resources to a terminal device.

According to a first aspect, an embodiment of this application provides a communication method, where the method includes:

determining, by a network device, a plurality of resource blocks, where the plurality of resource block units are for a terminal device;

sending, by the network device, resource indication information to the terminal device, where the resource indication information is used to indicate the plurality of resource blocks;

obtaining, by the terminal device, the resource indication information, where the resource indication information is used to indicate the plurality of resource blocks for the terminal device; and determining, by the terminal device, index information of the plurality of resource blocks.

Based on the method, the network device can efficiently perform resource configuration for the terminal device, so that the terminal device can accurately obtain a resource location in a timely manner.

In an optional design, the resource indication information includes S bits, and each of the S bits is used to indicate whether at least one resource block is for the terminal device. The at least one resource block indicated by each bit is consecutive in a frequency domain.

In an optional design, the $1^{st}$ bit in the S bits is used to indicate whether n consecutive resource blocks starting from a start resource block of a common index area are for the terminal device, and n is equal to m; or n is equal to a value determined based on a first offset and m; where m is notified by the network device or preconfigured, the first offset is an offset between the start resource block of the common index area and a frequency domain reference point, and the frequency domain reference point is notified by the network device or preconfigured.

In an optional design, n is equal to the value determined based on the first offset and m, wherein n is equal to y1, or n is equal to m minus y1, where y1 is equal to the first offset mod m.

In an optional design, the first offset is received by the terminal device from the network device.

In an optional design, the $1^{st}$ bit in the S bits is used to indicate whether n consecutive resource blocks starting from a start resource block of a bandwidth part (BWP) are for the terminal device, or is used to indicate whether m resource blocks adjacent to n consecutive resource blocks starting from a start resource block of a bandwidth part (BWP) are for the terminal device; where n is equal to a value determined based on m and a second offset, or n is equal to a value determined based on m, a first offset, and a second offset; and m is notified by the network device or preconfigured, the first offset is an offset between a start resource block of a common index area and a frequency domain reference point, the frequency domain reference point is notified by the network device or preconfigured, and the second offset is an offset between the start resource block of the common index area and a start resource block of a carrier bandwidth part (BWP).

In an optional design, when n is equal to the value determined based on m and the second offset, n is equal to m minus y2, and y2 is equal to the second offset mod m; or when n is equal to the value determined based on m, the first offset, and the second offset, n is equal to y3, or n is equal to a difference between m and y3, where y3 is equal to a third offset mod m, and the third offset is related to the first offset and the second offset.

In an optional design, the first offset and/or the second offset are/is received by the terminal device from the network device.

In an optional design, the network device sends offset indication information to the terminal device, and the terminal device obtains the offset indication information, where the offset indication information is used to indicate a quantity of RBs offset from the resource indication frequency domain reference point to the start resource block of the common index area or the start resource block of the carrier bandwidth part (BWP).

The resource indication frequency domain reference point may be the $1^{st}$ RB or the last RB in the at least one resource block indicated by the $1^{st}$ bit of the resource indication information.

The terminal device determines the index information of the plurality of resource blocks based on the offset indication information and the resource indication information.

In an optional design, a second bit in the S bits is used to indicate whether m resource blocks are for the terminal device, and the m resource blocks are adjacent to n resource blocks indicated by the 1st in the S bits.

In an optional design, m is equal to 1, 2, 4, 8, 3, 6, or 12.

According to a second aspect, an embodiment of the present disclosure provides an apparatus, including a processor and a receiver, where the receiver is configured to obtain resource indication information, where the resource indication information is used to indicate a plurality of resource blocks for the terminal device; and the processor is configured to determine index information of the plurality of resource blocks.

The second aspect further provides another apparatus, including a processor and a transmitter, where the processor is configured to determine a plurality of resource blocks, and the plurality of resource blocks are for a terminal device; and the transmitter is configured to send resource indication information to the terminal device, and the resource indication information is used to indicate the plurality of resource blocks.

In an optional design, the resource indication information includes S bits, and each of the plurality of bits is used to indicate whether at least one resource block is for the terminal device.

According to a third aspect, the present disclosure provides a method. In the method, a terminal device determines a plurality of control resource sets, where each control resource set is corresponding to one mapping manner of a control channel element; and the terminal device detects, in the control resource set, a control channel for carrying control information.

In an optional design, the terminal device obtains an offset, and the offset is used for mapping of the control channel element. The offset may be determined based on higher layer signaling, or determined based on an identifier configured by using higher layer signaling.

The third aspect further provides a method. In the method, a network device determines a plurality of control resource sets, where each control resource set is corresponding to one mapping manner of a control channel element.

In an optional design, the network device sends an offset to a terminal device, and the offset is used for mapping of the control channel element.

According to a fourth aspect, the present disclosure provides a system, including at least the two apparatuses according to the second aspect.

According to a fifth aspect, the present disclosure provides a wireless apparatus, where the wireless apparatus includes one or more processors and a memory, the memory stores a computer program, and when the processor executes the computer program, the apparatus is enabled to implement any method according to the first aspect and/or the third aspect.

According to a sixth aspect, the present disclosure provides a computer storage medium that stores a computer program. The computer storage medium stores a computer program. When executed by a processor or a device (a terminal device or a network device), the computer program implements any method according to the first aspect and/or the third aspect.

According to a seventh aspect, the present disclosure provides a computer program product that includes an instruction. When running on a computer, the computer program product enables the computer to execute any method according to the first aspect and/or the third aspect.

According to an eighth aspect, the present disclosure provides a chip system. The chip system includes a processor, configured to support a network device or an apparatus in implementing a function related to the first aspect and/or the third aspect, for example, generating or processing data and/or information related to the foregoing method. In a possible design, the chip system further includes a memory, and the memory is configured to store a program instruction and data that are necessary for the network device and the communication apparatus. The chip system may be constituted by a chip, or may include a chip and another discrete device.

According to a ninth aspect, the present disclosure provides a chip. The chip includes a processing module and a communication interface. The processing module is configured to control the communication interface to perform external communication. The processing module is further configured to implement any method according to the first aspect and/or the third aspect.

Compared with the prior art, in the solutions provided in the embodiments of the present disclosure, the network device can send the resource indication information to the terminal device to indicate the plurality of resource blocks for the terminal device, so that the terminal device can determine the plurality of resource blocks based on the resource indication information. In this manner, the network device can efficiently allocate or re-allocate uplink or downlink resources to the terminal device, thereby improving communication efficiency of the network system.

BRIEF DESCRIPTION OF DRAWINGS

The following describes in more detail the embodiments of the present disclosure with reference to the accompanying drawings.

DESCRIPTION OF EMBODIMENTS

A network architecture and a service scenario that are described in embodiments of the present disclosure are intended for clearer description of technical solutions in the embodiments of the present disclosure, and constitute no limitation on the technical solutions provided in the embodiments of the present disclosure. A person of ordinary skill in the art can learn that the technical solutions provided in the embodiments of the present disclosure are also applicable to similar technical issues as the network architecture evolves and a new service scenario emerges.

In the embodiments of the present disclosure, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
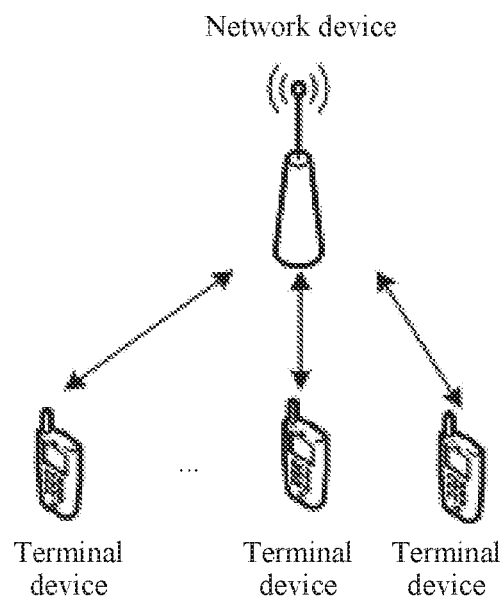
FIG. 1 shows a possible schematic diagram of an application scenario of an embodiment of the present disclosure.

FIG. 1 shows a possible schematic diagram of an application scenario of an embodiment of the present disclosure. A communication system in the application scenario includes a network device and one or more terminal devices. The network device and the terminal device may communicate with each other by using one or more air interface technologies.

The following describes terms that may appear in the embodiments of the present disclosure.

A communication system may be applicable to a Long Term Evolution (LTE) system or other wireless communication systems that use various radio access technologies, for example, systems that use access technologies such as Code Division Multiple Access, Frequency Division Multiple Access, Time Division Multiple Access, Orthogonal Frequency Division Multiple Access, and Single Carrier Frequency Division Multiple Access. Moreover, the communication system may also be applicable to a subsequent evolved system of the LTE system, for example, a fifth-generation 5G system.

A network device may be a base station, or an access point, or a network device, or a device that is in an access network and that communicates with a wireless terminal in one or more sectors on an air interface. The network device may be configured to perform mutual conversion between a received over-the-air frame and an IP packet and serve as a router between the wireless terminal and a remaining portion of the access network, where the remaining portion of the access network may include an Internet protocol (IP) network. The network device may coordinate attribute management of the air interface. For example, the network device may be a base transceiver station (BTS) in Global System for Mobile Communications (GSM) or Code Division Multiple Access (CDMA), or a NodeB (NB) in Wideband Code Division Multiple Access (WCDMA), or an evolved NodeB (eNB or eNodeB) in Long Term Evolution (LTE), or a relay node or an access point, or a base station in a future 5G network, for example, a gNB. No limitation is imposed herein. It should be noted that, in a 5G or an NR system, in one NR gNB, there may be one or more transmission reception points (TRP), all TRPs belong to a same cell, and each TRP and each terminal can use a measurement reporting method described in the embodiments of the present disclosure. In another scenario, the network device may further be divided into a control unit (CU) and a data unit (DU). Under the control of one CU, there may be a plurality of DUs. Each DU and each terminal can use the measurement reporting method described in the embodiments of the present disclosure. A difference between a CU-DU separation scenario and a multi-TRP scenario lies in that, the TRP is merely a radio frequency unit or an antenna device while the DU can implement a protocol stack function. For example, the DU can implement a physical layer function.

A terminal device may be a wireless terminal or a wired terminal. The wireless terminal may be a device that provides a user with voice and/or other service data connectivity, a handheld device with a wireless connection function, or other processing devices connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, and may be, for example, a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or user equipment. No limitation is imposed herein.

A symbol includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation and details are not described herein.

A control resource set (CORESET) is a resource set used for control channel transmission. Time domain resources in a CORESET may be consecutive or non-consecutive.

A resource block (RB), also referred to as a physical resource block, is a frequency domain resource unit, and occupies M consecutive subcarriers in a frequency domain. M is a natural number greater than 0. For example, in LTE, one RB occupies 12 consecutive subcarriers in a frequency domain.

A resource block set (RB Set) is a set of a plurality of RBs.

A subcarrier spacing is a minimum granularity in a frequency domain. For example, in LTE, a subcarrier spacing of one subcarrier is 15 kHz.

Higher layer signaling is different from physical layer signaling, and may be a master information block (MIB), a system information block (SIB), radio resource control (RRC) signaling, or other higher layer signaling that has a similar characteristic.

A bandwidth part (BWP) is a plurality of consecutive physical resource blocks in a frequency domain, and is generally configured by a network device for a terminal device. The terminal device receives or sends data in the BWP. In an example of control resource transmission, one BWP includes at least one control resource set, and the control resource set includes frequency domain resources not greater than the plurality of physical resource blocks included by the BWP in a frequency domain.

A common index scheme is an index scheme defined in a standard or a protocol, an index scheme determined by a network device in a communication system, or an index scheme determined by a plurality of network devices in a communication system through negotiation. The index scheme is used for resource configuration. In a communication system, a control resource and/or a data resource configured by a network device for a terminal device served by the network device are/is located in a common index area determined based on the common index scheme.

A common index area is a plurality of consecutive physical resource blocks in a frequency domain that are obtained based on a common index scheme. A bandwidth part (BWP) is located in the common index area. For example, a terminal device determines a frequency domain location of a BWP based on a common physical resource block index in the common index area.

Figure 2:
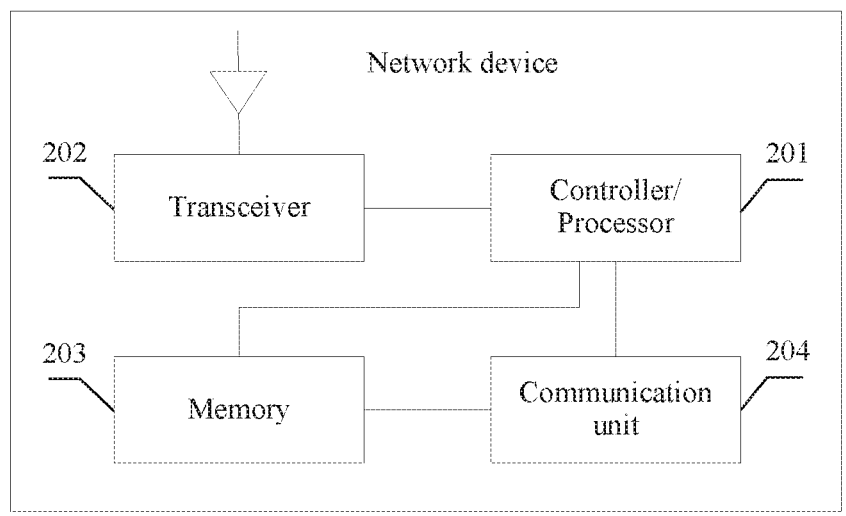
FIG. 2 shows a possible schematic structural diagram of a network device according to an embodiment of the present disclosure.

Further, a possible schematic structural diagram of the foregoing network device may be shown in FIG. 2. The network device can execute a method provided in the embodiments of the present disclosure. The network device may include a controller or processor 201 (the following uses the processor 201 as an example for description) and a transceiver 202. The controller/processor 201 sometimes may also be referred to as a modem processor. The modem processor 201 may include a baseband processor (BBP) (not shown). The baseband processor processes a received digital signal, to extract information or data bits transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to support information sending and receiving between the network device and a terminal device, and support radio communication between terminal devices. The processor 201 may further be configured to execute various functions for communication between the terminal device and another network device. In an uplink, an uplink signal from the terminal device is received by an antenna, demodulated by the transceiver 202, and further processed by the processor 201, to restore service data and/or signaling information sent by the terminal device. In a downlink, service data and/or a signaling message are/is processed by the processor 201, modulated by the transceiver 202 to generate a downlink signal, and transmitted by an antenna to the terminal device. The network device may further include a memory 203, and the memory 203 may be configured to store program code and/or data of the network device. The transceiver 202 may include independent receiver and transmitter circuits, or may implement sending and receiving functions in one circuit. The network device may further include a communication unit 204, and the communication unit 204 is configured to support the network device in communicating with other network entities. For example, the communication unit 204 is configured to support the network device in communicating with a network device and the like in a core network.

Optionally, the network device may further include a bus. The transceiver 202, the memory 203, and the communication unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
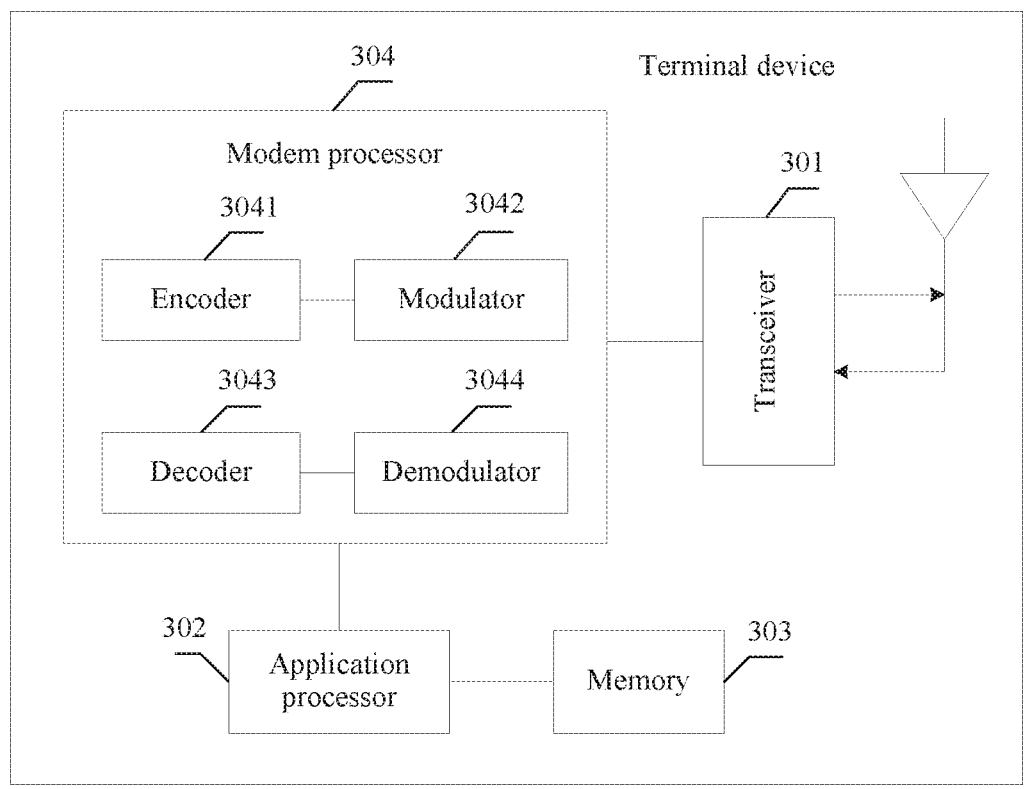
FIG. 3 shows a possible schematic structural diagram of a terminal device according to an embodiment of the present disclosure.

FIG. 3 is a possible schematic structural diagram of a terminal device in the foregoing communication system. The terminal device can perform a method provided in the embodiments of the present disclosure. The terminal device may be any one of the one or more terminal devices in FIG. 1. The terminal device includes a transceiver 301, an application processor 302, a memory 303, and a modem processor 304.

The transceiver 301 may perform adjustment (for example, analog conversion, filtering, amplification, and up-conversion) on the output sample and generate an uplink signal. The uplink signal is transmitted by an antenna to the base station in the foregoing embodiment. In a downlink, an antenna receives a downlink signal transmitted by a network device. The transceiver 301 may perform adjustment (for example, filtering, amplification, clown-conversion, and digitization) on a signal received from an antenna and provide an input sample.

The modem processor 304 sometimes may be referred to as a controller or a processor, and may include a baseband processor (BBP) (not shown). The baseband processor processes a received digital signal, to extract information or data bits transmitted in the signal. Based on a requirement or an expectation, the BBP is usually implemented in one or more digital signal processors (DSP) in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent in an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to perform demodulation processing on an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. These units perform processing based on radio access technologies used by a radio access network.

The modem processor 304 receives, from the application processor 302, digital data that may represent voice, data, or control information, and processes the digital data for transmission. The modem processor may support one or more of a plurality of wireless communication protocols of a plurality of communication systems, for example, LTE, New Radio, Universal Mobile Telecommunications System (UMTS), and High Speed Packet Access (HSPA). Optionally, the modem processor 304 may include one or more memories.

Optionally, the modem processor 304 and the application processor 302 may be integrated on one processor chip.

The memory 303 is configured to store program code (sometimes also referred to as a program, an instruction, software, or the like) and/or data that are/is used to support communication of the terminal device.

It should be noted that, the memory 203 or the memory 303 may include one or more storage units. For example, the storage unit may be a storage unit that is configured to store program code and that is inside the processor 201 or the modem processor 304 or the application processor 302, or may be an external storage unit that is independent of the processor 201 or the modem processor 304 or the application processor 302, or may further be a component that includes a storage unit inside the processor 201 or the modem processor 304 or the application processor 302 and an external storage unit that is independent of the processor 201 or the modem processor 304 or the application processor 302.

The processor 201 and the modem processor 304 (the processor 304 for short below) may be processors of a same type or processors of different types. For example, the processor 201 and modem processor 304 each may be implemented as a central processing unit (CPU), a general-purpose processor, a digital signal processor (DSP), an application-specific integrated circuit (ASIC), a field programmable gate array (FPGA), or another programmable logical device, a transistor logic device, a hardware component, another integrated circuit, or any combination thereof. The processor 201 and the modem processor 304 may implement or execute various logical blocks, modules, and circuits as examples that are described with reference to content disclosed in the embodiments of the present disclosure. The processor may also be a combination of devices that implement a computing function, for example, a combination including one or more microprocessors, a combination of a DSP and a microprocessor, or a System-On-a-Chip (SOC).

A person skilled in the art can understand that, various illustrative logical blocks, modules, circuits, and algorithms described with reference to the aspects disclosed in this application may be implemented as electronic hardware, an instruction that is stored in a memory or another computer readable medium and executed by a processor or another processing device, or a combination thereof. As an example, the device described in this specification may be applied to any circuit, hardware component, IC, or IC chip. The memory disclosed in this application may be a memory of any type and any size, and may be configured to store any type of required information. To clearly illustrate such interchangeability, the foregoing has generally described various illustrative components, blocks, modules, circuits, and steps in a form of functionality. How to implement such functionality depends on a specific application, a design selection, and/or a design constraint that is imposed on an entire system. A person skilled in the art may implement the described functionality for each specific application in a different manner. However, such implementation decision should not be construed as departing from the scope of the present disclosure.

In the embodiments of the present disclosure, sending a downlink (or uplink) channel may be sending data or information carried on the downlink (or uplink) channel. The data or information may be data or information obtained by channel coding.

In an example of a control resource, NR proposes a concept of a control resource set (CORESET) to improve blind detection efficiency of a terminal device. A network device allocates one or more control resource sets to each terminal device, and sends a control channel to a terminal device on any control resource set corresponding to the terminal device. The terminal device accesses a serving cell and obtains information about a resource block set (RB set) included in a CORESET in a frequency domain. The resource block set included in the control resource set is located in a downlink BWP. When control resource allocation is performed in NR, an allocation granularity of the resource block set in a frequency domain is 6 consecutive resource blocks (RB).

Generally, resources occupied by a BWP in a frequency domain may be configured by using dedicated signaling of a terminal device, for example, RRC signaling. No limitation is imposed herein. At most four BWPs can be configured for one terminal device for downlink transmission, and at most four BWPs can further be configured for one terminal device for uplink transmission. Moreover, different terminal devices may have different BWP configurations. In actual transmission, only one uplink/downlink BWP is activated. Resources of a bandwidth part BWP are located in bandwidth of a system carrier. A quantity of physical resource blocks of a common index area included in the system carrier may be determined based on Table 1 below. The terminal device determines a subcarrier spacing μ indicated by received indication information, and determines the quantity of the physical resource blocks of the common index area based on μ and Table 1. Alternatively, the terminal device receives a notification from the network device to determine the quantity of the physical resource blocks of the common index area or the terminal device determines the quantity of the physical resource blocks of the common index area based on a definition in a standard or a protocol. No limitation is imposed herein. The following uses a table lookup manner as an example for description.

TABLE 1

| μ | Quantity of physical resource blocks |
|---|---|
| 0 | 275 |
| 1 | 275 |
| 2 | 275 |
| 3 | 275 |
| 4 | 138 |
| 5 | 69 |

μ is corresponding to a size of the subcarrier spacing, as shown in Table 2. For example, when μ=0, there are 275 physical resource blocks, and common resource block indexes (Common RB index) are from index {0} to index {274}, that is, {0, 1, 2, 3, . . . , 274}. The common RB indexes are used to configure resources occupied by a BWP in a frequency domain. Resource blocks in one BWP are consecutive in a frequency domain, and a minimum granularity in the frequency domain is one resource block. The common RB indexes may be configured by the network device. For a given subcarrier spacing, the network device configures an offset from an RB with an index 0 in the common RB indexes to a frequency domain reference point. The frequency domain reference point is a frequency domain location that is notified (for example, by using higher layer signaling) by the network device, or is preconfigured or defined. The frequency domain reference point may be one of: a physical resource block with a minimum index included in a synchronization signal/physical broadcast channel block (SS/PBCH Block) of a primary serving cell (Pcell), an uplink frequency domain location that is notified by using system information and is in a primary serving cell (Pcell), a frequency domain location that is indicated by secondary serving cell configuration information and is in a secondary serving cell (Scell), and a frequency domain area indicated by supplement uplink frequency domain configuration information in supplement uplink (SUL) frequency domain. No limitation is imposed herein.

TABLE 2

| μ | Subcarrier spacing |
|---|---|
| 0 | 15 |
| 1 | 30 |
| 2 | 60 |
| 3 | 120 |
| 4 | 240 |
| 5 | 480 |

Figure 4:
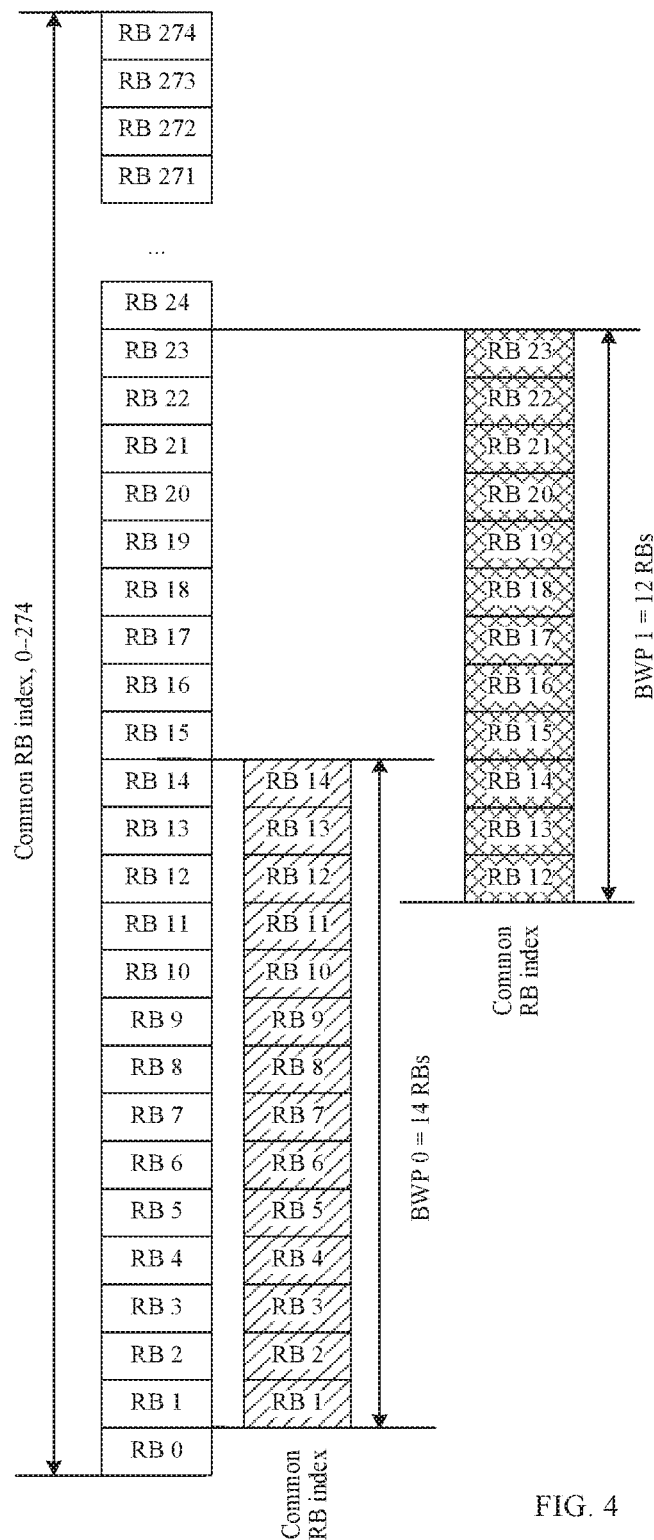
FIG. 4 shows a possible BWP configuration in the prior art.

For example, the network device respectively configures one BWP for each of two terminal devices UE 0 and UE 1, namely, a BWP 0 and a BWP 1. Resources of the BWP 0 are 14 consecutive frequency domain resource blocks with indexes from {1} to {14} in the common RB indexes, to be specific, the resources of the BWP 0 are corresponding to resource blocks corresponding to {1, 2, 3, 4, 5, 6, 7, 8, 9, 10, 11, 12, 13, 14} in the common RB indexes; resources of the BWP 1 are 12 consecutive frequency domain resource blocks with indexes from {12} to {23} in the common RB indexes, to be specific, the resources of the BWP 1 are corresponding to resource blocks corresponding to RB indexes {12, 13, 14, 15, 16, 17, 18, 19, 20, 21, 22, 23} in the common RB indexes, as shown in FIG. 4. The common RB indexes included in the BWP 0 are {1, 2, 3, 4, 5, 6, 7, 8, 9, 10, 11, 12, 13, 14}, and corresponding BWP RB indexes are {0, 1, 2, 3, 4, 5, 6, 7, 8, 9, 10, 11, 12, 13}. Likewise, BWP RB indexes corresponding to the BWP 1 may also be numbered starting from 0.

Specifically, the network device may configure the BWP 0 as a bandwidth part of the UE 0 and the BWP 1 as a bandwidth part of UE 1. Alternatively, the BWP 0 and the BWP 1 are two candidate bandwidth parts configured by the network device for a same UE. There may be BWP2, BWP3, and more in an actual scenario. No limitation is imposed herein. To avoid a control channel resource collision problem caused by occupation of a same RB by CORESETs in different BWPs, when CORESET resources in the BWP 0, the BWP 1, and more BWPs are allocated, on an overlapped RB resource, a CORESET resource of only one BWP is configured. The following uses FIG. 5 as an example for description.

Figure 5:
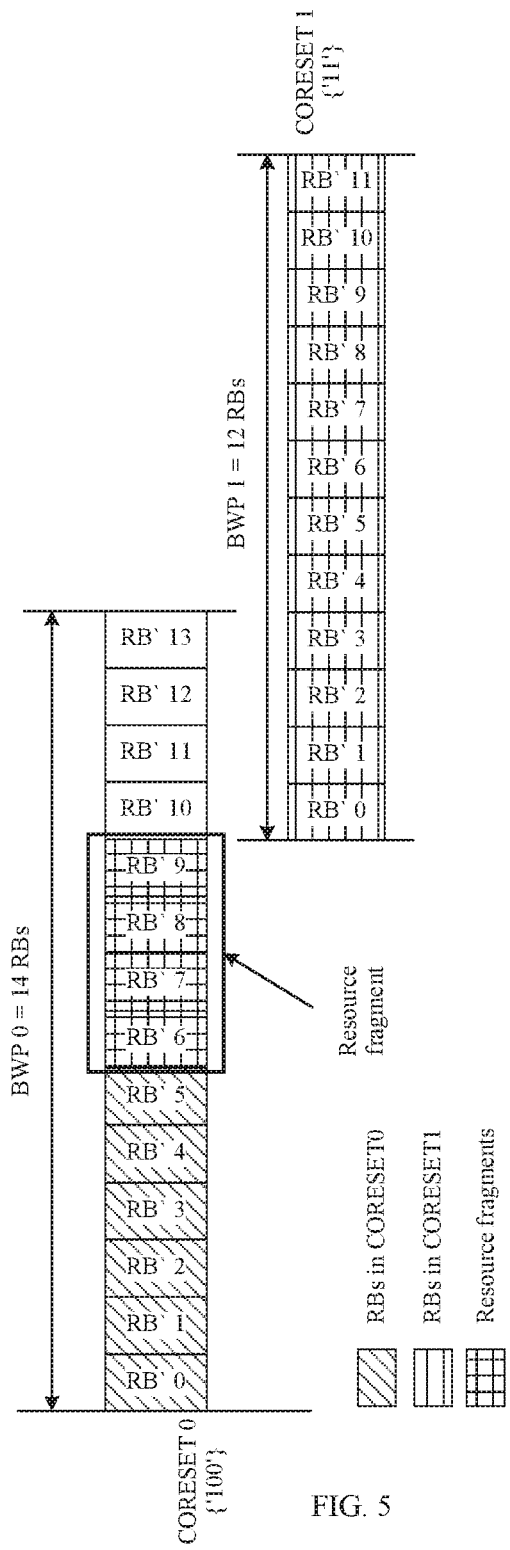
FIG. 5 shows another possible BWP configuration in the prior art.

In FIG. 5, resource indication information is used to indicate a plurality of resource blocks for a terminal device. A bitmap manner may be used for indication. Each bit in a bitmap is corresponding to 6 resource blocks (an example in which a resource allocation granularity of an RE set is 6 resource blocks is used for description). The BWP 0 includes a CORESET 0 and a bitmap of resource allocation indication information is {'100'}. In other words, indexes of physical resource blocks in BWP 0 that are included in the CORE-SET 0 are {0, 1, 2, 3, 4, 5}. The BWP 1 includes a CORESET 1 and a bitmap of resource allocation indication information is {'11'}. In other words, indexes of physical resource blocks in BWP 1 that are included in the CORE-SET 1 are {0, 1, 2, 3, 4, 5, 6, 7, 8, 9, 10, 11}.

Common RB indexes corresponding to RBs with indexes {10, 11, 12, 13} in the CORESET 0 are the same as common RB indexes corresponding to RBs with indexes {0, 1, 2, 3} in the CORESET 1, as shown in FIG. 4. Therefore, in the BWP 0, the RB with indexes {10, 11, 12, 13} cannot be allocated to the CORESET 0. In addition, because a resource allocation granularity of a CORESET is 6 RBs, four RBs corresponding to RB indexes {6, 7, 8, 9} in the BWP 0 cannot meet a size (6 RBs) of the resource allocation granularity, and cannot be used by the CORESET 0 in the BWP 0 or allocated to another BWP for use. Therefore, the RBs with indexes {6, 7, 8, 9} in the BWP 0 become resource fragments, lowing frequency spectrum utilization.

Because the resource granularity (6 RBs) of a CORESET in a frequency domain does not match a resource granularity (1 RB) of a bandwidth part in a frequency domain, a resource fragment that cannot be used for CORESET configuration exists in a bandwidth part, lowering frequency spectrum utilization. Data channel transmission has a same problem.

It should be noted that, a term "start resource block" is used in the embodiments of the present disclosure. A meaning of the term may be a resource block corresponding to a minimum subcarrier number in resource blocks included in a specific area (for example, a common index area or a bandwidth part), or a resource block with a minimum number in the included resource blocks numbered from a low frequency to a high frequency; or may be a resource block corresponding to a maximum subcarrier number in resource blocks included in a specific area (for example, a common index area or a bandwidth part), or a resource block with a maximum number in the included resource blocks numbered from a low frequency to a high frequency. The low frequency and the high frequency are defined relative to a subcarrier number. A subcarrier number of a lower frequency location is smaller than a subcarrier number of a higher frequency location. No specific limitation is imposed in the embodiments. A specific start resource block depends on a requirement of an actual communication system, a notification from the network device, or a definition in a standard or a protocol.

It should be further noted that, for expressions such as "$1^{st}$ bit", "$2^{nd}$ bit", and "last bit" in the embodiments of the present disclosure, a meaning of "$1^{st}$ bit" is a most significant bit (MSB) in a plurality of bits, a meaning of "$2^{nd}$ bit" is a most significant bit other than the MSB in the plurality of bits, and so on. A meaning of "last bit" is a least significant bit (LSB) in a plurality of bits. In the embodiments of the present disclosure, "$1^{st}$", "$2^{nd}$", and similar expressions are used for ease of solution description.

It should be noted that, a correspondence may exist between any two or more of a frequency domain location of a start resource block of the common index area, a frequency domain location of a frequency domain reference point, a quantity of resource blocks in the common index area, a location of a start resource block of a BWP, a quantity of resource blocks included in a BWP, and a subcarrier spacing. The correspondence may be defined in a standard or a protocol, determined by a network device, or obtained by a network device. No limitation is imposed herein. The mapping relationship does not affect implementation of the embodiments of the present disclosure, and the embodiments of the present disclosure cover all possibilities.

For example, for different subcarrier spacings, start resource blocks in common index areas have a same frequency domain location or different frequency domain locations relative to a frequency domain reference point.

For another example, start resource blocks of a plurality of common index areas where a plurality of BWPs locate are aligned or unaligned in a frequency domain, and subcarrier spacings configured for the plurality of BWPs are the same or different.

The following further describes the embodiments of the present disclosure in detail based on a common aspect of the present disclosure described above. Possible uplink and downlink latencies are ignored in descriptions of the embodiments. It is assumed that a sending moment of a network device is the same as a receiving moment of a terminal device. Processing corresponding to sending of the network device and receiving of the terminal device is mostly described from a perspective of a terminal device side in the embodiments. A person skilled in the art can understand that, "the terminal device receives . . . from the network device" indicates that the network device has performed sending. For an expression of "resource block unit" in the present disclosure, a person skilled in the art can understand that, the resource block unit is logical division of resource blocks for ease of resource configuration based on a corresponding resource allocation granularity. The resource block unit can cover other expressions used for resource block division.

In addition, numbers of steps in the embodiments of the present disclosure do not limit a sequence of a specific execution process. An execution sequence of the steps is adaptively adjusted in different optional designs. Values of parameters represented by using letters in the embodiments of the present disclosure are all non-negative integers, in other words, values indicated by the letters are all non-negative integers.

Embodiment 1

An embodiment of the present disclosure provides a communication method. In the method, a terminal device obtains resource indication information, where the resource indication information indicates a plurality of resource blocks for the terminal device; and the terminal device determines index information of the plurality of resource blocks. According to the method provided in this embodiment of the present disclosure, the network device can efficiently allocate or re-allocate uplink or downlink resources to one or more terminal devices, thereby improving processing efficiency of the terminal device.

Figure 6:
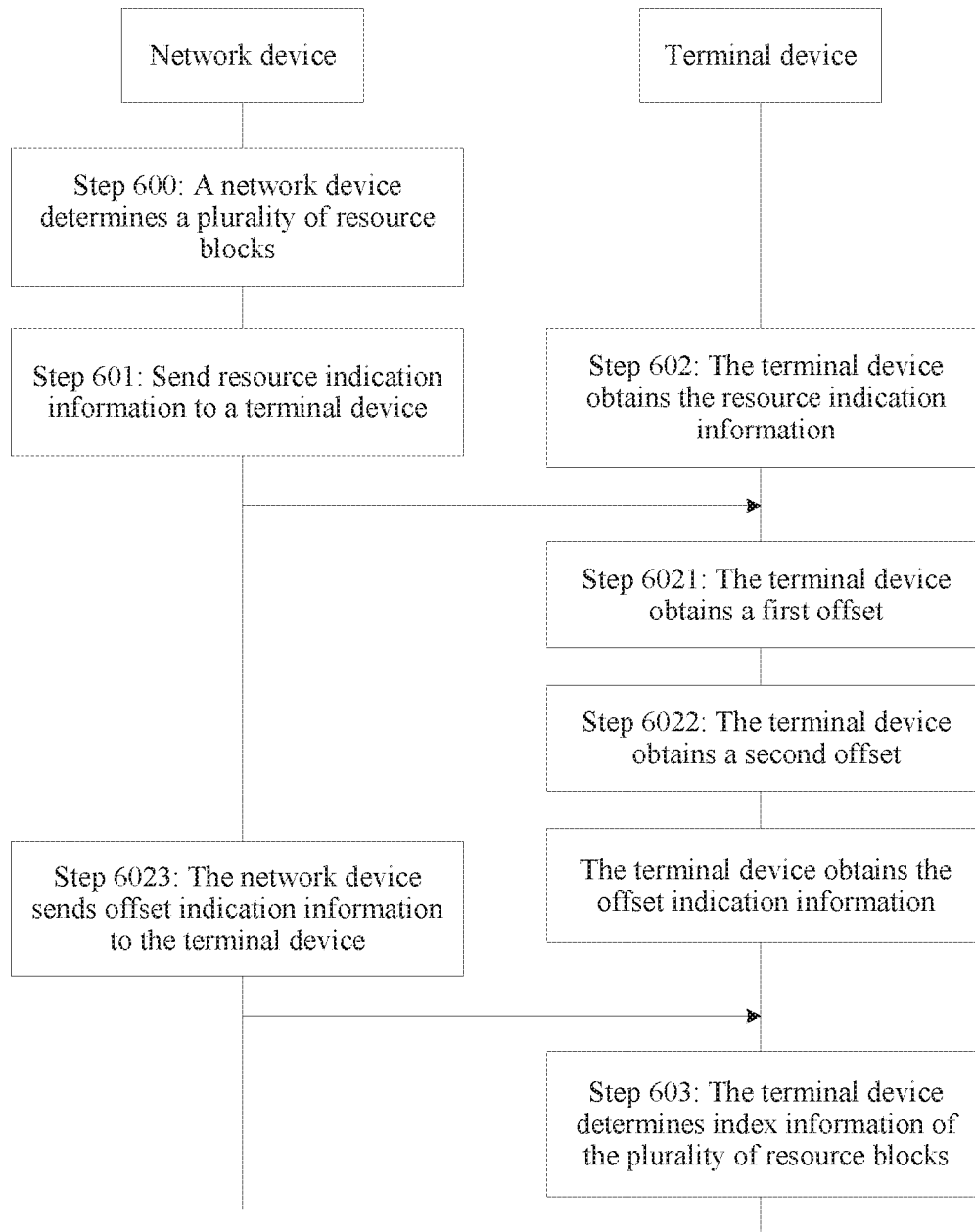
FIG. 6 shows a possible schematic flowchart of a communications method according to an embodiment of the present disclosure.

FIG. 6 shows a specific implementation of the communication method in embodiment 1 of the present disclosure. The following describes, based on FIG. 6, a solution provided in embodiment 1 of the present disclosure.

Step 600: A network device determines a plurality of resource blocks, where the plurality of resource blocks are configured for a first terminal device.

Optionally, the network device further configures, for a second terminal device, a plurality of resource blocks that do not overlap or that partially overlap with the plurality of resource blocks. For ease of subsequent expression, any terminal device for which the network device configures a plurality of resource blocks is simply expressed as a "terminal device".

The determining step and/or the configuration step are/is performed by a processor 201 of the network device.

Step 601: The network device sends resource indication information to the terminal device, where the resource indication information is used to indicate the plurality of resource blocks in step 600.

This step may be performed by a transceiver 202 of the network device, or performed by the transceiver 202 under control of the processor 201 of the network device.

Optionally, the resource indication information may include a plurality of bits, which for example, may be a bitmap. Each of the plurality of bits is used to indicate whether at least one resource block (when the at least one resource block is a plurality of resource blocks, the plurality of resource blocks are consecutive in a frequency domain) is for the terminal device. Specifically, when a bit is 0, the bit is used to indicate that at least one resource block corresponding to the bit cannot be used for the terminal device; or when a bit is 1, the bit is used to indicate that at least one resource block corresponding to the bit can be used for the terminal device.

The resource indication information may include a plurality of bits whose bit value is 1. A set of the resource blocks corresponding to these bits is configured for the terminal device.

It should be noted that, a quantity of the plurality of bits included in the resource indication information, a location of at least one resource block corresponding to each bit, and a quantity of resource blocks corresponding to each bit vary with a specific configuration manner. The following provides a description as an example. For ease of description, the quantity of the bits included in the resource indication information is referred to as S, and S is a positive integer.

It should be further noted that, the network device may configure a plurality of groups of candidate resource blocks for each terminal device, for example, configure a plurality of candidate BWPs. Each candidate BWP includes a resource block that can be used for the terminal device. The plurality of resource blocks mentioned herein may be one of the groups of candidate resource blocks or resource blocks in one of the plurality of candidate BWPs. The terminal device determines to send a data channel to the network device by using one of the plurality of groups of candidate resource blocks, or to receive a control channel from or send a control channel to the network device by using one of the plurality of groups of candidate resource blocks.

Optionally, the resource indication information is frequency domain resource configuration information of a control resource set (CORESET), for example, a resource block set (RB set); or the resource indication information is frequency domain resource configuration information of a data resource set, for example, frequency domain resource configuration information of a physical uplink shared channel (PUSCH) and/or a physical downlink shared channel (PDSCH).

Step 602: The terminal device obtains the resource indication information, where the resource indication information is used to indicate the plurality of resource blocks for the terminal device.

The obtaining step may be performed by a transceiver 301 or a processor 304 of the terminal device, or performed by the transceiver 301 under control of the processor 304.

Step 603: The terminal device determines index information of the plurality of resource blocks.

The index information may be index information of the plurality of resource blocks in a common index area or index information of the plurality of resource blocks in a bandwidth part.

Optionally, the index information of the plurality of resource blocks may be a resource block index of any one or more of the plurality of resource blocks. For example, index information of other resource blocks in the plurality of resource blocks may be determined by using index information of a start resource block of the plurality of resource blocks. For another example, locations of the plurality of resource blocks may be determined by using the index information of the start resource block of the plurality of resource blocks, without a need to determine index information of all of the plurality of resource blocks.

The determining step may be performed by the processor 304 of the terminal device.

Specifically, after determining the index information of the plurality of resource blocks, the terminal device receives, on the plurality of resource blocks, a control or data channel sent by the network device, or sends, on the plurality of resource blocks, a data channel to the network device.

By using the communication method implemented in steps 600 to 603, the network device can notify the terminal device of allocated or re-allocated uplink or downlink resources by using the resource indication information, so that the terminal device can efficiently obtain locations of the resources in a timely manner, thereby improving processing efficiency of the terminal device.

It should be noted that, in embodiment 1 of the present disclosure: the determining operation of the network device may be performed by using the processor 201; the sending and receiving operations of the network device may be performed by using the transceiver 202 or performed by using the transceiver 202 under control of the processor 201; the determining operation of the terminal device may be performed by using the processor 304; the obtaining operation of the terminal device may be performed by using the processor 304 or the transceiver 301 or performed by using the transceiver 301 under control of the processor 304, which specifically depends on an obtaining manner; the sending and receiving operations of the terminal device may be performed by using the transceiver 301.

In embodiment 1 of the present disclosure, indexes of the plurality of resource blocks for the terminal device may be configured based on a common index area resource block index (Common RB index) or configured based on a bandwidth part resource block index (BWP RB index). A specific configuration manner may be determined by the network device, or determined based on a definition in a standard or a protocol, or determined in another manner. No limitation is imposed herein. The start resource block of the BWP may have a specific offset, referred to as a second offset below, relative to the start resource block of the common index area. It should be noted that, when resource block indexes of a common index area and a BWP area are independently set, in other words, separately numbered, the resource blocks in both the common index area and the BWP area can be consecutively numbered starting from any number from a start resource block, for example, starting from 0 or starting from 1. Embodiment 1 of the present disclosure imposes no specific limitation. In a specific implementation, numbering mostly starts from 0 as an example.

In a first optional design, indexes of the plurality of resource blocks for the terminal device are configured based on the common RB indexes. In this optional design, the common RB indexes may be used as indexes of RBs in one or more BWPs configured in resource blocks of the common index area or new RB indexes may be defined as indexes of RBs in one or more BWPs configured in resource blocks of the common index area, for example, numbering starts from $RB_0$. However, the indexes of the plurality of resource blocks for the terminal device are configured based on the common RB indexes.

Optionally, the method further includes step 6021: The terminal device obtains a first offset, where the first offset is an offset between a start resource block of a common index area and a frequency domain reference point, and the offset may be a quantity of RBs offset from the start resource block of a common index area to a frequency domain reference point. For an explanation of the frequency domain reference point, refer to the description above. Different subcarrier spacings may be corresponding to a same first offset or different first offsets. No specific limitation is imposed herein.

Optionally, the terminal device further obtains a quantity of the resource blocks of the common index area. For a specific manner of obtaining the quantity of the resource blocks, refer to the above description of the quantity of the resource blocks in the common index area. No specific limitation is imposed herein. The terminal device may obtain the quantity of the resource blocks in any manner. For ease of description, the quantity of the resource blocks of the common index area is referred to as X1 in embodiment 1 of the present disclosure.

Optionally, the network device sends the first offset to the terminal device, and the terminal device receives the first offset from the network device, for example, by using higher layer signaling. The higher layer signaling may be RRC signaling. Alternatively, the terminal device determines the first offset by using a preconfigured table or a correspondence. The correspondence may be a correspondence between the first offset and a subcarrier spacing or another correspondence that may be used to obtain the first offset. Alternatively, the first offset may be obtained based on an indication or another value corresponding to the first offset.

Optionally, the first offset may be a quantity of RBs, that is, the first offset is a quantity of RBs offset from the start resource block of the common index area to the frequency domain reference point.

In a first possible implementation, the start resource block of the common index area is used as a boundary for alignment in configuration of the plurality of resource blocks.

In this possible implementation, the $1^{st}$ bit in the S bits is used to indicate whether n resource blocks starting from the start resource block of the common index area are for the terminal device.

A value of n is equal to m, which is a resource allocation granularity, and may be determined by the network device or notified to the terminal device, or preconfigured. And m is a positive integer.

For example, in a NR, system an allocation granularity of the RB set for a CORESET in a frequency domain is 6 consecutive RBs. Resources that are less than 6 consecutive RBs cannot be used for RB set resource allocation. In this case, m is equal to 6.

Figure 7:
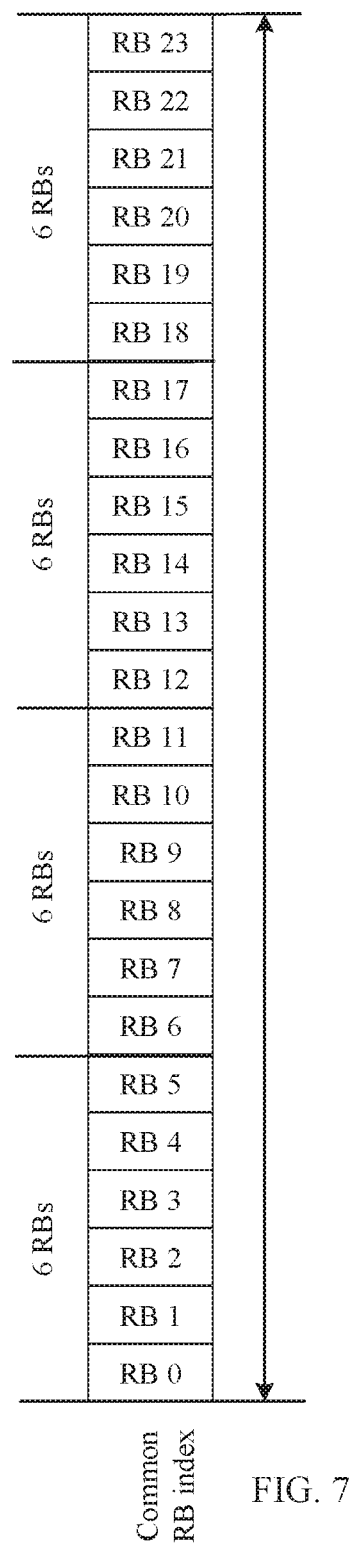
FIG. 7 shows a possible resource configuration manner according to an embodiment of the present disclosure.

FIG. 7 is an example for illustrating the foregoing resource configuration manner. In FIG. 7, when the plurality of resource blocks, for example, 24 RBs, are configured based on the common RB indexes, first four bits in the S bits each indicate 6 consecutive RBs in a frequency domain, and the $1^{st}$ bit indicates 6 consecutive RBs starting from the start resource block. Optionally, if the quantity of the plurality of resource blocks is not an integer multiple of 6, a quantity of resource blocks included in a last resource block unit is less than 6.

For another example, for data channel transmission, a resource block group RBG is used as an allocation granularity for resource configuration of a physical downlink shared channel (PDSCH) and a physical uplink shared channel (PUSCH). However, an RBG size (that is, a quantity of RBs included in each RBG) may be related to BWP bandwidth. In addition, different BWPs may be corresponding to different RBG sizes. The correspondence between an RBG size and BWP bandwidth may be determined by the network device or preconfigured. Optionally, the correspondence may be presented in a form of table, for example, Table 3. Each entry in the table is corresponding to one BWP bandwidth size, for example, a quantity of RBs. Each entry contains two RBG size configurations. Therefore, m needs to be determined based on a related parameter such as the BWP bandwidth. In addition, when a BWP is corresponding to a plurality of RBG sizes, the network device further needs to determine one of the RBG sizes as m, and notify the terminal device. A manner of the notification may be higher layer signaling, for example, RRC signaling. For example, m may be 1, 2, 4, 8, 3, 6, or 12.

TABLE 3

| BWP bandwidth | Configuration 1 | Configuration 2 |
|---|---|---|
| X0 to X1 RBs | RBG size 1 | RBG size 2 |
| X1 + 1 to X2 RBs | RBG size 3 | RBG size 4 |
| ... | ... | ... |

Optionally, the $2^{nd}$ bit in the S bits is used to indicate whether m resource blocks are for the terminal device, and the m resource blocks are adjacent to n resource blocks indicated by the 1st in the S bits.

Further, optionally, m resource blocks indicated by the $3^{rd}$ bit in the S bits are adjacent to m resource blocks indicated by the $2^{nd}$ bit.

In this possible implementation, S may be either of the following:

Value 1: $S=\lfloor X1/m \rfloor$, where $\lfloor \rfloor$ indicates rounding-down.

Value 2: $S=\lceil X1/m \rceil$, where $\lceil \rceil$ indicates rounding-up, and a quantity of resource blocks indicated by a last bit in the S bits is less than m.

In this possible implementation, m consecutive RBs starting from the start resource block of the common index area may be used as one resource block unit for resource configuration. In such configuration manner, the network device can configure resources for a plurality of terminal devices in a manner of aligning boundaries of resource block units, to be specific, try to use m RBs as a unit to perform resource configuration for a plurality of terminal devices or a plurality of resources, to ensure that resource blocks configured for the terminal devices are aligned at boundaries relative to the start RB by using m resource blocks as a resource block unit, in other words, to ensure that a quantity of RBs offset between a boundary of each resource block unit configured for the terminal devices and the start RB is a multiple of m, so as to as far as possible avoid resource block fragments (a fragment of RBs less than m) that cannot be allocated, thereby improving resource utilization efficiency. The boundary may be at least one of a low frequency boundary resource block and a high frequency boundary resource block of the resource block unit.

It should be noted that, such resource block unit division in embodiment 1 of the present disclosure is merely logical division, and is not presented in physical resources.

In a second possible implementation, the frequency domain reference point is used as a boundary for alignment in configuration of the plurality of resource blocks.

In this possible implementation, the $1^{st}$ bit in the S bits is used to indicate whether n resource blocks starting from the start resource block of the common index area are for the terminal device. n is determined based on the first offset and m, and n is greater than 0. For an explanation of m, refer to the description above. Details are not described herein again.

Optionally, n is determined based on the first offset and m, n is equal to y1, or n is equal to m minus y1, wherein y1 is equal to the first offset mod m, that is, the first offset mod m.

In a first optional implementation, when the first offset is an offset from the start resource block RB towards a low frequency direction relative to the frequency domain reference point, if y1 is unequal to 0, n is equal to y1; or if y1 is equal to 0, n is equal to m minus y1. In this way, the $1^{st}$ bit indicates y1 resource blocks starting from the start RB, and resource configuration is performed by trying to use m RBs as a resource block unit starting from a $(y1+1)^{th}$ resource block, so that the frequency domain reference point is located at a logical boundary for resource block unit allocation.

For another example, when the first offset is an offset from the start resource block RB towards a high frequency direction to the frequency domain reference point, n is equal to m minus y1, wherein y1 is equal to the first offset mod m, that is, the first offset mod m. In this way, the $1^{st}$ bit indicates (m−y1) resource blocks starting from the start RB, and the (m−y1) resource blocks and y1 RB fragments in the first offset can form a resource block unit of m resource blocks in terms of quantity, so that the frequency domain reference point is located at a logical boundary for resource block unit allocation.

Optionally, the $2^{nd}$ bit in the S bits is used to indicate whether m resource blocks are for the terminal device, and the m resource blocks are adjacent to n resource blocks indicated by the 1st bit in the S bits.

Further, optionally, m resource blocks indicated by the $3^{rd}$ bit in the S bits are adjacent to m resource blocks indicated by the $2^{nd}$ bit.

In this possible implementation, S may be any one of the following, and specifically depends on a requirement or configuration of an actual communication scenario:

Value 1: $S=\lfloor (X1-n)/m \rfloor$, where $\lfloor \rfloor$ indicates rounding-down.

Value 2: $S=\lfloor (X1-n)/m \rfloor +1$, where $\lfloor \rfloor$ indicates rounding-down.

Value 3: $S=\lceil (X1-n)/m \rceil$, where $\lceil \rceil$ indicates rounding-up.

Value 4: $S=\lceil (X1-n)/m \rceil +1$, where $\lceil \rceil$ indicates rounding-up.

A difference between this possible implementation and the first possible implementation lies in an alignment location. In the first possible implementation, the start RB in the common index area is used as the alignment location. In the second possible implementation, the frequency domain reference point is used as the alignment location. However, processing manners are similar.

In this possible implementation, the frequency domain reference point may be used as a boundary for resource block unit configuration. In such configuration manner, the network device can configure resources for a plurality of terminal devices in a manner of aligning boundaries of resource block units, to be specific, use the frequency domain reference point as a resource block unit boundary for resource configuration performed by using m RBs as a unit, to ensure that resource blocks configured for each terminal device are aligned at a boundary relative to the frequency domain reference point by using m resource blocks as a resource block unit, in other words, to ensure that a quantity of RBs offset from a boundary of each resource block unit configured for the terminal devices to the frequency domain reference point is a multiple of m, so as to avoid as far as possible resource block fragments (a fragment of RBs less than m) that cannot be allocated, thereby improving resource utilization efficiency. The boundary may be at least one of a low frequency boundary resource block and a high frequency boundary resource block of the resource block unit.

In a third possible implementation, the determining, by the terminal device, index information of the plurality of resource blocks in step 603 is performed by using offset indication information.

The method further includes step 6023: The network device sends offset indication information to the terminal device, and the terminal device obtains the offset indication information. The offset indication information is used to indicate a quantity Q of RBs offset from a resource indication reference resource block to the start resource block of the common index area. The resource indication reference resource block may be determined by the network device, or defined by a protocol or a standard, or preconfigured, and may be the $1^{st}$ RB or the last RB in at least one resource block indicated by the $1^{st}$ bit in the resource indication information. Herein, "$1^{st}$" and "last" may be "$1^{st}$" and "last" of low frequency locations or "$1^{st}$" and "last" of high frequency locations. For definitions of the high frequency and the low frequency, refer to the explanations above. In terms of function, a configuration of the resource indication reference resource block is used by the terminal device to determine the index information of the plurality of resource blocks.

For example, the quantity Q of RBs offset from a resource indication reference resource block to the start resource block of the common index area is used to indicate Q consecutive resource blocks starting from the start resource block of the common index area towards a high frequency direction, for example, indicate Q consecutive resource blocks $RB_0$, $RB_1$, . . . , $RB_{m-1}$ in the common index area when resource blocks are numbered from 0. Q is greater than or equal to 0 and less than m. For m, refer to the description above.

For another example, when the resource indication reference resource block is the last RB in the at least one resource block indicated by the $1^{st}$ bit in the resource indication information, the $1^{st}$ bit in the S bits is corresponding to Q consecutive resource blocks starting from the start RB, and Q is not equal to 0.

For another example, when the resource indication reference resource block is the $1^{st}$ RB in the at least one resource block indicated by the $1^{st}$ bit in the resource indication information, and if Q is equal to 0, the $1^{st}$ bit in the S bits is corresponding to m consecutive resource blocks starting from the start resource block of the common index area; or if Q is not equal to 0, the $1^{st}$ bit in the S bits is corresponding to m consecutive resource blocks adjacent to Q consecutive resource blocks starting from the start resource block of the common index area.

Further, optionally, the $2^{nd}$ bit in the S bits is corresponding to m resource blocks adjacent to resource blocks corresponding to the $1^{st}$ bit in the common index area.

Optionally, the offset indication information is carried in downlink control information DCI or higher layer signaling, and is notified by the network device to the terminal device, or is pre-notified by the network device to the terminal device and stored by the terminal device.

Further, optionally, the offset indication information may be a plurality of bits, and a value indicated by the plurality of bits represents a quantity of offset RBs, as described in Table 4 below.

TABLE 4

| Offset indication information | Offset |
| --- | --- |
| 000 | 0 RBs |
| 001 | 1 RB |
| 010 | 2 RBs |
| 011 | 3 RBs |
| 100 | 4 RBs |
| 101 | 5 RBs |

In this possible implementation, in addition to sending the resource indication information to the terminal device, the network device further indicates, to the terminal device, location information of a part of resource blocks indicated by the resource indication information, so that the terminal device can accurately and efficiently obtain resource configuration information, thereby improving processing efficiency of the terminal device.

In a second optional design, the plurality of resource blocks for the terminal device are configured based on a resource block index (RB index) of the BWP.

Optionally, the method further includes step 6021 in the first optional design. For details, refer to the description above.

Optionally, the method further includes step 6022: The terminal device obtains a second offset, where the second offset is an offset between the start resource block of the common index area and a start resource block of the carrier bandwidth part (BWP), and the offset may be a quantity of RBs offset from the start resource block of the common index area to a start resource block of the carrier bandwidth part BWP.

Optionally, the terminal device further obtains a quantity of resource blocks in the BWP. The quantity of the resource blocks in the BWP may be determined through a lookup table, or determined by receiving a notification of the network device, or determined based on a definition in a standard or a protocol. No limitation is imposed herein. For example, the quantity of the resource blocks in the BWP may be indicated by using higher layer signaling, for example, RRC signaling. For ease of description, the quantity of the resource blocks in the BWP is referred to as X2 in embodiment 1 of the present disclosure.

Further, optionally, the network device sends the second offset to the terminal device, and the terminal device receives the second offset from the network device, for example, by using higher layer signaling. The higher layer signaling may be RRC signaling. Alternatively, the terminal device determines the second offset by using a preconfigured table or a correspondence. The correspondence may be a correspondence between the second offset and a subcarrier spacing or another correspondence that may be used to obtain the second offset. Alternatively, the second offset may further be obtained based on an indication or another value corresponding to the second offset. No limitation is imposed herein.

Specifically, the second offset may be a quantity of RBs, to be specific, the second offset is a quantity of RBs offset from the start resource block of the BWP to the start resource block of the common index area.

In a first possible implementation, the start resource block of the common index area is used as a boundary for alignment in configuration of the plurality of resource blocks.

In this possible implementation, the $1^{st}$ bit in the S bits is used to indicate whether n consecutive resource blocks starting from the start resource block of the BWP are for the terminal device, or is used to indicate whether m resource blocks adjacent to n consecutive resource blocks starting from the start resource block of the BWP are for the terminal device. n is determined based on m and the second offset, and n is greater than 0. For an explanation of m, refer to the description above. Details are not described herein again.

Frequency domain resources in the BWP are a part of or all resource blocks of frequency domain resources in the common index area. Based on this, the second offset is an offset from the start resource block of the BWP towards a high frequency direction to the start RB in the common index area.

Specifically, n is equal to m minus y2, and y2 is equal to second offset mod m, that is, the second offset mod m.

Optionally, if y2 is equal to 0, the $1^{st}$ bit in the S bits is used to indicate whether n consecutive resource blocks starting from the start resource block of the BWP are for the terminal device.

Optionally, if y2 is unequal to 0, the $1^{st}$ bit in the S bits is used to indicate whether m resource blocks adjacent to n consecutive resource blocks starting from the start resource block of the BWP are for the terminal device.

Optionally, if y2 is unequal to 0, the $1^{st}$ bit in the S bits is used to indicate whether n consecutive resource blocks starting from the start resource block of the BWP are for the terminal device.

Figure 8:
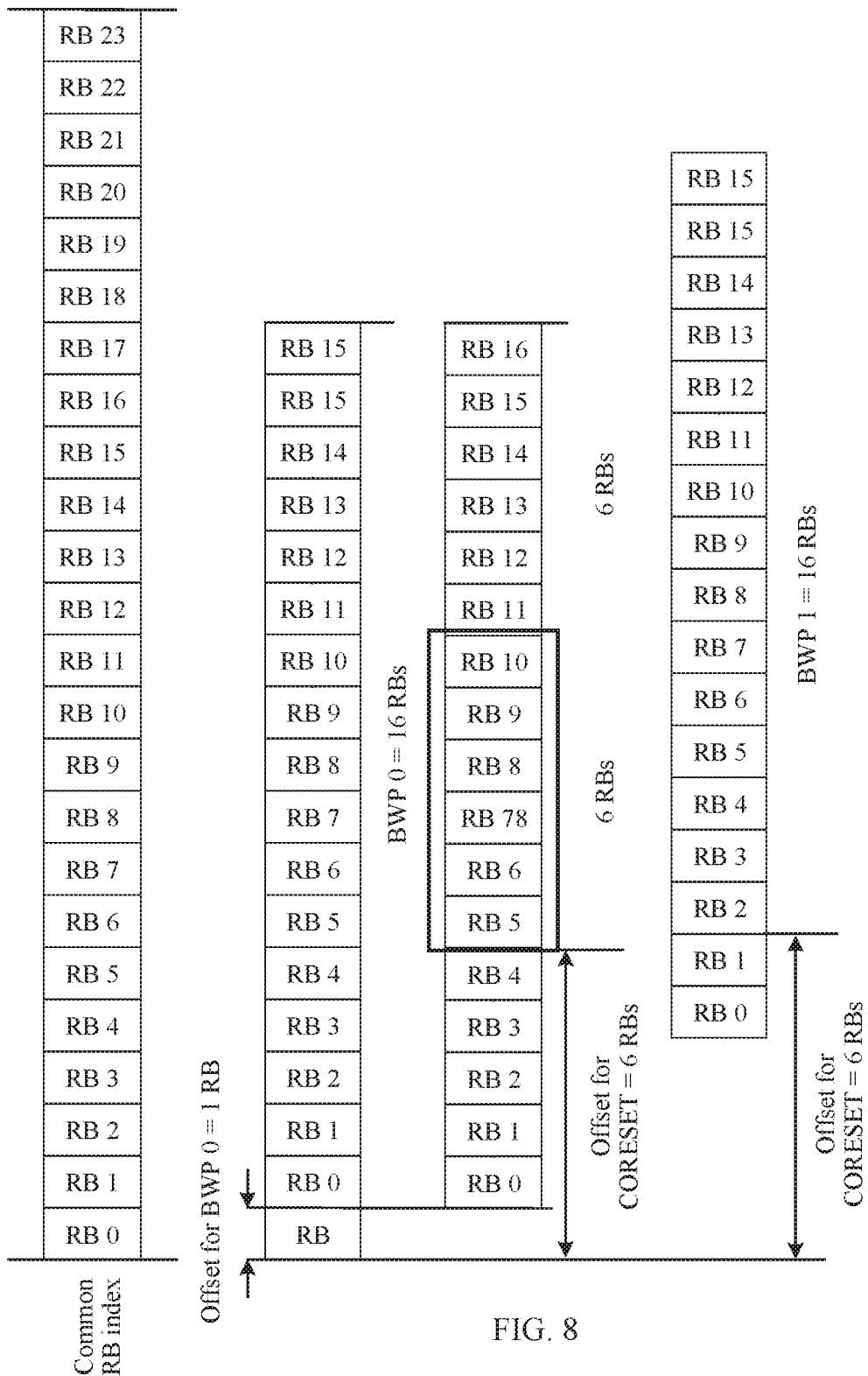
FIG. 8 shows another possible resource configuration manner according to an embodiment of the present disclosure.

Referring to FIG. 8, a BWP 0 and a BWP 1 configured by the network device for at least one terminal device are both located in resource blocks in the common index area. A start location of the BWP 0 is 1 RB offset from the start resource block in the common index area towards the high frequency direction, and a start location of the BWP 1 is 4 RB offset from the start resource block in the common index area towards the high frequency direction. To use the start resource block of the common index area as a boundary for resource block unit configuration, starting from the start resource block of the BWP 0, first five RBs $RB_0$-$RB_4$ are used as one resource block unit, $RB_5$-$RB_{10}$ are used as one resource block unit, and so on. This can ensure that a quantity of RBs offset from the start resource block RBs of the $2^{nd}$ resource block unit in the BWP to the start resource block of the common index area is an integer multiple of 6. Similarly, a quantity of RBs offset from a start resource block $RB_{11}$ of the $3^{rd}$ resource block unit in the BWP 0 to the start resource block of the common index area is also an integer multiple of 6. Likewise, $RB_0$ and $RB_1$ in the BWP 1 are used as one resource block unit. In this implementation, even if the network device may configure more BWPs in addition to the BWP 0 and the BWP 1, it can be ensured that there are as few resource fragments as possible in an overlapped part of the plurality of BWPs, because a quantity of RBs offset from a start or last resource block of each resource block unit to the start resource block RB in the common index area is an integer multiple of m.

Optionally, the $2^{nd}$ bit in the S bits is used to indicate whether m resource blocks are for the terminal device, and the m resource blocks are adjacent to n resource blocks indicated by the $1^{st}$ bit in the S bits.

Further, optionally, m resource blocks indicated by a $3^{rd}$ bit in the S bits are adjacent to m resource blocks indicated by the $2^{nd}$ bit.

In this possible implementation, S may be any one of the following:

Value 1: $S=\lfloor(X2-n)/m\rfloor$, where $\lfloor\ \rfloor$ indicates rounding-down.

Value 2: $S=\lfloor(X2-n)/m\rfloor+1$, where $\lfloor\ \rfloor$ indicates rounding-down.

Value 3: $S=\lceil(X2-n)/m\rceil+1$, where $\lceil\ \rceil$ indicates rounding-up.

Value 4: $S=\lceil(X2-n)/m\rceil$, where $\lceil\ \rceil$ indicates rounding-up.

In this possible implementation, the start resource block of the common index area may be used as a boundary for resource block unit configuration. In such configuration manner, the network device can configure resources for a plurality of terminal devices in a manner of aligning boundaries of resource block units, to be specific, use m RBs as a unit to perform resource configuration, to ensure that resource blocks configured for the terminal devices are aligned at boundaries relative to the start RB by using m resource blocks as a resource block unit, in other words, to ensure that a quantity of offset RBs between a boundary of each resource block unit configured for the terminal devices and the start RB is a multiple of m, so as to avoid as far as possible resource block fragments (a fragment of RBs less than m) that cannot be allocated, thereby improving resource utilization efficiency. The boundary may be at least one of a low frequency boundary resource block and a high frequency boundary resource block of the resource block unit.

In a second possible implementation, the frequency domain reference point is used as a boundary for alignment in configuration of the plurality of resource blocks.

In this possible implementation, a $1^{st}$ bit in the S bits is used to indicate whether n consecutive resource blocks starting from the start resource block of the BWP are for the terminal device, or is used to indicate whether m resource blocks adjacent to n consecutive resource blocks starting from the start resource block of the BWP are for the terminal device. n is determined based on m and a third offset, and n is greater than 0. For an explanation of m, refer to the description above. Details are not described herein again.

Optionally, n is equal to y3 or is equal to a difference between m and y3, wherein y3 is equal to the third offset mod m. The third offset is related to the first offset and the second offset. Specifically, the third offset is an offset between the start resource block of the BWP and the frequency domain reference point. Alternatively, the third offset may further be obtained based on an indication or another value corresponding to the third offset, instead of being determined based on the first offset and the second offset.

Further, optionally, the third offset may be a quantity of offset RBs. To be specific, the third offset is a quantity of RBs offset from the start resource block of the BWP to the frequency domain reference point.

For example, when the third offset is an offset of the start resource block (RB) in the BWP towards a low frequency direction relative to the frequency domain reference point, n is equal to y3 or is equal to m minus y3, wherein y3 is equal to the third offset mod m, that is, the third offset mod m. In this way, the $1^{st}$ bit indicates y3 resource blocks starting from the start resource block of the BWP, and resource configuration is performed by trying to use m RBs as a resource block unit starting from a $(y3+1)^{th}$ resource block, so that the frequency domain reference point is located at a logical boundary for resource block unit allocation.

In this case:

optionally, if y3 is unequal to 0, n is equal to y3, and a $1^{st}$ bit in the S bits is used to indicate whether n consecutive resource blocks starting from the start resource block of the bandwidth part BWP are for the terminal device, or is used to indicate whether m resource blocks adjacent to n consecutive resource blocks starting from the start resource block of the bandwidth part BWP are for the terminal device; and optionally, if y3 is equal to 0, n is equal to the value obtained by subtracting y3 from m, in other words, equal to m, and the $1^{st}$ bit in the S bits is used to indicate whether n consecutive resource blocks starting from the start resource block of the BWP are for the terminal device.

For another example, when the third offset is an offset from the start resource block of the BWP towards a high frequency direction relative to the frequency domain reference point, n is equal to m minus y3, that is (m−y3), wherein y3 is equal to the third offset mod m, that is, the third offset mod m. In this way, the $1^{st}$ bit indicates (m−y3) resource blocks starting from the start resource block of the BWP, and the (m−y3) resource blocks and y3 RB fragments in the third offset can form a resource block unit of m resource blocks in terms of quantity, so that the frequency domain reference point is located at a logical boundary for resource block unit allocation.

In this case:

optionally, if y3 is equal to 0, the $1^{st}$ bit in the S bits is used to indicate whether n consecutive resource blocks starting from the start resource block of the BWP are for the terminal device; and optionally, if y3 is unequal to 0, the $1^{st}$ bit in the S bits is used to indicate whether n consecutive resource blocks starting from the start resource block of the BWP are for the terminal device, or is used to indicate whether m resource blocks adjacent to n consecutive resource blocks starting from the start resource block of the BWP are for the terminal device.

Optionally, a $2^{nd}$ bit in the S bits is used to indicate whether m resource blocks are for the terminal device, and the m resource blocks are adjacent to n resource blocks indicated by the $1^{st}$ bit in the S bits. Optionally, "adjacent" is "adjacent in the high frequency direction".

Further, optionally, m resource blocks indicated by a $3^{rd}$ bit in the S bits are adjacent to m resource blocks indicated by the $2^{nd}$ bit.

In this possible implementation, S may be any one of the following:

Value 1: $S=\lfloor (X2-n)/m \rfloor$, where $\lfloor \rfloor$ indicates rounding-down.

Value 2: $S=\lfloor (X2-n)/m \rfloor +1$, where $\lfloor \rfloor$ indicate rounding-down.

Value 3: $S=\lceil (X2-n)/m \rceil +1$, where $\lceil \rceil$ indicates rounding-up.

Value 4: $S=\lceil (X2-n)/m \rceil$, where $\lceil \rceil$ indicates rounding-up.

In this possible implementation, the frequency domain reference point may be used as a boundary for resource block unit configuration. In such configuration manner, the network device can configure resources for a plurality of terminal devices in a manner of aligning boundaries of resource block units, to be specific, use the frequency domain reference point as a boundary for resource configuration performed by using m RBs as a unit, to ensure that resource blocks configured for each terminal device are aligned at a boundary relative to the frequency domain reference point by using m resource blocks as a resource block unit, in other words, to ensure that a quantity of RBs offset between a boundary of each resource block unit configured for the terminal devices and the frequency domain reference point is a multiple of m, so as to as far as possible avoid resource block fragments (a fragment of RBs less than m) that cannot be allocated, thereby improving resource utilization efficiency. The boundary may be at least one of a low frequency boundary resource block and a high frequency boundary resource block of the resource block unit.

In a third possible implementation, the determining, by the terminal device, index information of the plurality of resource blocks in step 603 is performed by using offset indication information.

The method further includes step 6023: The network device sends offset indication information to the terminal device, and the terminal device obtains the offset indication information. The offset indication information is used to indicate a quantity Q of RBs offset from a resource indication reference resource block to the start resource block of the common index area or the start resource block of the BWP. For explanations of the resource indication reference resource block and the offset indication information, refer to the description above. Details are not described herein again.

For example, the quantity Q of offset RBs is used to indicate Q consecutive resource blocks starting from the start resource block of the common index area or the start resource block of the BWP, for example, indicate Q consecutive resource blocks $RB_0$, $RB_1$, . . . , $RB_{m-1}$ starting from the start resource block of the common index area or the start resource block of the BWP. Q is greater than or equal to 0 and less than m. For m, refer to the description above.

For another example, when the resource indication reference resource block is a last RB in at least one resource block indicated by the $1^{st}$ bit in the resource indication information, the $1^{st}$ bit in the S bits is corresponding to Q consecutive resource blocks starting from the start resource block of the common index area or the start resource block of the BWP, and Q is not 0.

For another example, when the resource indication reference resource block is a first RB in at least one resource block indicated by the $1^{st}$ bit in the resource indication information, the $1^{st}$ bit in the S bits is corresponding to m consecutive resource blocks starting from the start resource block of the common index area or the start resource block of the BWP, and Q is 0.

In this optional design, the network device configures the resource blocks for the terminal device based on a BWP resource block index RB index. When the offset indication information indicates the Q consecutive resource blocks starting from the start resource block of the common index area, the terminal device determines the index information of the plurality of resource blocks by using the offset indication information and the second offset.

Further, optionally, a $2^{nd}$ bit in the S bits is corresponding to m resource blocks adjacent to resource blocks corresponding to the $1^{st}$ bit in the common index area or the BWP.

Optionally, the offset indication information is carried in downlink control information DCI or higher layer signaling, and is notified by the network device to the terminal device, or is pre-notified by the network device to the terminal device and stored by the terminal device.

Further, optionally, the offset indication information may be a plurality of bits, and a value indicated by the plurality of bits represents a quantity of offset RBs, as described in Table 4.

In this possible implementation, in addition to sending the resource indication information to the terminal device, the network device further indicates, to the terminal device, a start location of some of resource blocks indicated by the resource indication information, so that the terminal device can efficiently obtain resource configuration information, thereby improving processing efficiency of the terminal device.

In a third optional design, the network device configures, based on the common RB index, the resource blocks for the terminal device.

Optionally, the method further includes step 6021 in the first optional design. For details, refer to the description above.

Optionally, the method further includes step 6022 in the second optional design. For details, refer to the description above.

Further, the terminal device further obtains a quantity X1 of resource blocks in the common index area and a quantity X2 of resource blocks in the BWP. For explanations of X1 and X2, refer to the description above. Meanings of X1 and X2 are the same as those described above.

In a first possible implementation, the start resource block of the common index area is used as a boundary for alignment in configuration of the plurality of resource blocks.

In this possible implementation, a $1^{st}$ bit in the S bits is used to indicate whether n resource blocks starting from the start resource block of the BWP are for the terminal device, or is used to indicate whether m resource blocks adjacent to n consecutive resource blocks starting from the start resource block of the BWP are for the terminal device. An index of the start resource block of the BWP uses an index of a resource block of the common index area, and is determined based on an index of the start resource block of the common index area and a second offset. n is determined based on the second offset and m, and n>0. For an explanation of m, refer to the description above. Details are not described herein again.

For example, an RB index of the start resource block of the common index area is 0, an index of the start resource block of the BWP is (0+the second offset) in the common index area.

Frequency domain resources in the BWP are some or all resource blocks of frequency domain resources in the common index area. Based on this, the second offset is an offset of the start resource block of the BWP in a high frequency direction relative to the start resource block of the common index area.

Specifically, n is equal to m minus y2, and y2 is equal to the second offset mod m, that is, the second offset mod m. For an optional correspondence between the y2 and a resource block location indicated by the $1^{st}$ bit in the S bits, refer to the description of the first possible implementation in the second optional design.

Optionally, a second bit in the S bits is used to indicate whether m resource blocks are for the terminal device, and the m resource blocks are adjacent to n resource blocks indicated by the $1^{st}$ bit in the S bits.

Further, optionally, m resource blocks indicated by a $3^{rd}$ in the S bits are adjacent to m resource blocks indicated by the second bit.

In this possible implementation, S may be any one of the following:

Value 1: $S=\lfloor(X2-n)/m\rfloor$, where $\lfloor\ \rfloor$ indicates rounding-down.

Value 2: $S=\lfloor(X2-n)/m\rfloor+1$, where $\lfloor\ \rfloor$ indicates rounding-down.

Value 3: $S=\lceil(X2-n)/m\rceil+1$, where $\lceil\ \rceil$ indicates rounding-up.

Value 4: $S=\lceil(X2-n)/m\rceil$, where $\lceil\ \rceil$ indicates rounding-up.

In this possible implementation, the start resource block of the common index area may be used as a boundary for resource block unit configuration. In such configuration manner, the network device can configure resources for a plurality of terminal devices in a manner of aligning boundaries of resource block units, to be specific, use m RBs as a unit to perform resource configuration, to ensure that resource blocks configured for the terminal devices are aligned at boundaries relative to the start resource block by using m resource blocks as a resource block unit, in other words, to ensure that a quantity of offset RBs between a boundary of each resource block unit configured for the terminal devices and the start RB is a multiple of m, so as to avoid as far as possible resource block fragments (a fragment of RBs less than m) that cannot be allocated, thereby improving resource utilization efficiency. The boundary may be at least one of a low frequency boundary resource block and a high frequency boundary resource block of the resource block unit.

In a second possible implementation, the frequency domain reference point is used as a boundary for alignment in configuration of the plurality of resource blocks.

In this possible implementation, a $1^{st}$ bit in the S bits is used to indicate whether n resource blocks starting from the start resource block of the BWP are for the terminal device, or is used to indicate whether m resource blocks adjacent to n consecutive resource blocks starting from the start resource block of the BWP are for the terminal device. An index of the start resource block of the BWP uses an index of a resource block of the common index area, and is determined based on an index of the start resource block of the common index area and the second offset. n is determined based on m and a third offset, and n is greater than 0. For an explanation of m, refer to the description above. Details are not described herein again.

For example, an RB index of the start resource block of the common is 0, an index of the start resource block of the BWP is (0+the second offset) in the common index area.

Optionally, n is equal to y3 or is equal to a difference between m and y3, wherein y3 is equal to the third offset mod m. The third offset is related to the first offset and the second offset. Specifically, the third offset is an offset that is between the start resource block R0 of the BWP and the frequency domain reference point and that is obtained based on the first offset and the second offset. Alternatively, the third offset may further be obtained based on an indication or another value corresponding to the third offset, instead of being determined based on the first offset and the second offset.

Further, optionally, the third offset may be a quantity of offset RBs. To be specific, the third offset is a quantity of RBs offset from the start resource block R0 in the BWP to the frequency domain reference point.

For example, when the third offset is an offset from the start resource block of the BWP towards a low frequency direction relative to the frequency domain reference point, n is equal to y3 or is equal to m minus y3. The value of y3 is equal to the third offset mod m, that is, the third offset mod m. In this way, the $1^{st}$ bit indicates y3 resource blocks starting from the start resource block of the BWP, and resource configuration is performed by trying to use m RBs as a resource block unit starting from a $(y3+1)^{th}$ resource block, so that the frequency domain reference point is located at a logical boundary for resource block unit allocation.

For another example, when the third offset is an offset of the start resource block of the BWP towards a high frequency direction relative to the frequency domain reference point, n is equal to the difference obtained by subtracting y3 from m, that is (m−y3), wherein y3 is equal to the third offset mod m, that is, the third offset mod m. In this way, the $1^{st}$ bit indicates (m−y3) resource blocks starting from the start resource block of the BWP, and the (m−y3) resource blocks and y3 RB fragments in the third offset can form a resource block unit of m resource blocks in terms of quantity, so that the frequency domain reference point is located at a logical boundary for resource block unit allocation.

It should be noted that, for an optional correspondence between y3 and a resource block location indicated by the $1^{st}$ bit in the S bits, refer to the description of the second possible implementation in the second optional design.

Optionally, a second bit in the S bits is used to indicate whether m resource blocks are for the terminal device, and the m resource blocks are adjacent to n resource blocks indicated by the $1^{st}$ bit in the S bits. Optionally, "adjacent" is "adjacent in the high frequency direction".

Further, optionally, m resource blocks indicated by a $3^{rd}$ bit in the S bits are adjacent to m resource blocks indicated by the second bit. Optionally, "adjacent" is "adjacent in the high frequency direction".

In this possible implementation, S may be any one of the following:

Value 1: $S=\lfloor(X2-n)/m\rfloor$, where $\lfloor\ \rfloor$ indicates rounding-down.

Value 2: $S=\lfloor(X2-n)/m\rfloor+1$, where $\lfloor\ \rfloor$ indicates rounding-down.

Value 3: $S=\lceil(X2-n)/m\rceil+1$, where $\lceil\ \rceil$ indicates rounding-up.

Value 4: $S=\lceil(X2-n)/m\rceil$, where $\lceil\ \rceil$ indicates rounding-up.

In this possible implementation, the frequency domain reference point may be used as a boundary for resource block unit configuration. In such configuration manner, the network device can configure resources for a plurality of terminal devices in a manner of aligning boundaries of resource block units, to be specific, use the frequency domain reference point as a boundary for resource configuration performed by using m RBs as a unit, to ensure that resource blocks configured for each terminal device are aligned at a boundary relative to the frequency domain reference point by using m resource blocks as a resource block unit, in other words, to ensure that a quantity of offset RBs between a boundary of each resource block unit configured for the terminal devices and the frequency domain reference point is a multiple of m, so as to avoid as far as possible resource block fragments (a fragment of RBs less than m) that cannot be allocated, thereby improving resource utilization efficiency. The boundary may be at least one of a low frequency boundary resource block and a high frequency boundary resource block of the resource block unit.

Embodiment 2

Embodiment 2 of the present disclosure provides a control resource set determining method, so that when a plurality of control resource sets overlap on time-frequency resources, a resource blocking probability of a control channel included by each of the control resource sets is minimized.

Step 0: A network device determines a plurality of control resource sets, where each control resource set is corresponding to one mapping manner of a control channel element.

A terminal device determines the plurality of control resource sets, where each control resource set is corresponding to one mapping manner of a control channel element.

The corresponding operation in step 0 may be performed by the processor 304 of the terminal device shown in FIG. 3 or the processor 201 of the network device shown in FIG. 2.

Step 1: The terminal device detects, in the control resource set, a control channel carrying control information.

The operation in step 1 may be performed by the processor 304 of the terminal device shown in FIG. 3.

The control channel includes a plurality of control channel elements (CCE). The control channel element includes a plurality of REG bundles.

In an implementation, a REG bundle set included by a control channel element j is $\{f(6j/L), f(6j/L+1), \ldots, f(6j/L+6/L-1)\}$; where $$f(x)=(rC+c+n_{shift}) \bmod N_{RB}^{CORESET} N_{symb}^{CORESET}/L$$

$$x=cA+r$$

$$r=0, 1, \ldots, A-1$$

$$c=0, 1, \ldots, C-1$$

$$C=N_{RB}^{CORESET} N_{symb}^{CORESET}/(A \cdot L); \text{ or}$$

$$f(x)=((x \bmod A) \cdot C+\lfloor x/C \rfloor+n_{shift}) \bmod (N_{RB}^{CORESET} N_{symb}^{CORESET}/L)$$

$$C=N_{RB}^{CORESET} N_{symb}^{CORESET}/(A \cdot L); \text{ where}$$

the terminal device receives higher layer signaling from the network device, and determines A based on the higher layer signaling, where a value set is $\{2, 3, 6\}$;

L is a quantity of REGs included in a REG bundle, and optionally, may be determined based on higher layer signaling;

$N_{RB}^{CORESET}$ is a quantity of resource blocks included by the control resource set in a frequency domain;

$N_{symb}^{CORESET} \in \{1, 2, 3\}$ is a quantity of symbols included by the control resource set in a time domain; and $n_{shift}$ may be configured by using higher layer signaling, or $n_{shift}=6 \cdot n_{ID} \cdot N_{symb}^{CORESET}/L$, where $n_{ID}$ is determined based on higher layer signaling.

In this method, it can be ensured that CCE can be mapped to a plurality of discrete REGs in a control resource set to obtain frequency diversity gain. Moreover, no matter what a configured $n_{ID}$ is, it can be ensured that the CCE mapped to a control resource set is offset in a frequency domain in a granularity of 6 consecutive RBs. In this way, when a plurality of control resource sets overlap on time-frequency resources, a resource blocking probability of a control channel included by each of the control resource sets is minimized.

Optionally, the method further includes step 2: The terminal device obtains an offset, where the offset is used for mapping of the control channel element, and the offset may be determined based on higher layer signaling or determined based on an identifier configured by using higher layer signaling.

In an implementation, that the offset may be determined based on higher layer signaling includes: The offset $n_{shift}$ may be determined based on a formula $n_{shift}=6 \cdot n_{ID} \cdot N_{symb}^{CORESET}/L$, where $n_{ID}$ is the identifier configured by using the higher layer signaling, $N_{symb}^{CORESET} \in \{1, 2, 3\}$ is a quantity of symbols included by the control resource set in a time domain, and L is a quantity of Resource element groups (REG) included by a REG bundle.

A beneficial effect of the method is as follows: No matter what a configured $n_{ID}$ is, it can be ensured that a CCE mapped to a control resource set is offset in a frequency domain in a granularity of 6 consecutive RBs. In this way, when a plurality of control resource sets overlap on time-frequency resources, a resource blocking probability of a control channel included by each of the control resource sets is minimized.

The obtaining step and the higher layer signaling receiving step of the terminal device in the foregoing steps may be performed by a receiver 301A in the terminal device in FIG. 3. The sending step of the network device may be performed by a transmitter 202B in FIG. 2.

The foregoing mainly describes the solutions provided in the embodiments of the present disclosure from a perspective of interaction between network elements. It can be understood that, to implement the foregoing functions, the network elements such as the network device and the terminal device include corresponding hardware structures and/or software modules for executing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

The following provides a further description based on a possible structure of the terminal device in FIG. 3. The terminal device can execute any method in the embodiments of the present disclosure. The terminal device may include at least a transceiver 301 and a processor 304 (a superordinate expression of processor is used herein, and the processor 304 may represent a modem processor 304 or an integration of the modem processor 304 and an application processor 302). Optionally, the terminal device may further include other components in FIG. 3 and the description about FIG. 3, such as a memory. Herein, the transceiver 301 may be constituted by an independent receiver and an independent transmitter, to separately execute corresponding receiving and sending functions; or may be a transceiver that integrates the receiving and sending functions. No further limitation is imposed herein. The transceiver 301 in FIG. 3 may be structurally split into a receiver 301A and a transmitter 301B. The terminal device is used only as an optional main body for a description as an example herein. The following provides a description by using a wireless apparatus as a main body. The wireless apparatus may be a unit, a chip, or a part included by the terminal device, or may be the terminal device itself.

For embodiment 1 of the present disclosure:

The wireless apparatus includes a processor 304 and a receiver 301A.

The receiver 301A is configured to obtain resource indication information, where the resource indication information is used to indicate a plurality of resource blocks for the terminal device.

The processor 304 is configured to determine index information of the plurality of resource blocks.

Optionally, the resource indication information includes S bits, and each of the S bits is used to indicate whether at least one resource block is for the terminal device.

Optionally, a $1^{st}$ bit in the S bits is used to indicate whether n consecutive resource blocks starting from a start resource block of a common index area are for the terminal device, and n is equal to m; or n is equal to a value determined based on a first offset and m; where m is notified by a network device or preconfigured, the first offset is an offset between the start resource block of the common index area and a frequency domain reference point, and the frequency domain reference point is notified by the network device or preconfigured.

Further, optionally, when n is equal to the value determined based on the first offset and m, n is equal to y1, or n is equal to m minus y1, where y1 is equal to the first offset mod m.

Optionally, the receiver 301A is further configured to obtain the first offset from the network device.

Optionally, a $1^{st}$ bit in the S bits is used to indicate whether n consecutive resource blocks starting from a start resource block of a BWP are for the terminal device, or is used to indicate whether m resource blocks adjacent to n consecutive resource blocks starting from a start resource block of a bandwidth part BWP are for the terminal device; where n is equal to a value determined based on m and the second offset, or n is equal to a value determined based on m, the first offset, and the second offset; and m is notified by the network device or preconfigured, the first offset is an offset between a start resource block of a common index area and a frequency domain reference point, the frequency domain reference point is notified by the network device or preconfigured, and the second offset is an offset between the start resource block of the common index area and a start resource block of a carrier BWP.

Further, optionally, when n is equal to the value determined based on m and the second offset, n is equal to m minus y2, and y2 is equal to the second offset mod m; or when n is equal to the value determined based on m, the first offset, and the second offset, n is equal to y3, or n is equal to a difference between m and y3, where y3 is equal to a third offset mod m, and the third offset is related to the first offset and the second offset.

Optionally, the receiver 301A is further configured to obtain the first offset and/or the second offset from the network device.

Optionally, the receiver 301A or the processor 304 obtains offset indication information, where the offset indication information is used to indicate a quantity of RBs offset from a resource indication reference resource block to the start resource block of the common index area or the start resource block of the carrier BWP.

Further, optionally, the resource indication reference resource block may be a first RB or a last RB in the at least one resource block indicated by the $1^{st}$ bit in the resource indication information.

Further, optionally, the processor 304 determines the index information of the plurality of resource blocks based on the offset indication information and the resource indication information.

Optionally, a second bit in the S bits is used to indicate whether m resource blocks are for the terminal device, and the m resource blocks are adjacent, in a frequency domain, to n resource blocks indicated by the $1^{st}$ bit in the S bits.

Optionally, m is equal to 1, 2, 4, 8, 3, 6, or 12.

It should be noted that, for a specific implementation of a communication method executed by the wireless apparatus, refer to the description of the communication method provided in the embodiments of the present disclosure. The terminal device in this embodiment of the present disclosure and the communication method corresponding to FIG. 6 are based on a same idea, and technical effects brought by the terminal device are the same as those of the communication method. Specific functions of the processor and the receiver included in the wireless apparatus in this embodiment of the present disclosure and any features, terms, and implementation details that are related to the specific functions are corresponding to the functions of the terminal device in the method embodiment corresponding to FIG. 6. For specific content, refer to the description of the method embodiment corresponding to FIG. 6 in the present disclosure. Details are not described herein again.

For embodiment 2 of the present disclosure:

The wireless apparatus includes a processor 304 and a receiver 301A, to execute any method provided in embodiment 2 of the present disclosure.

It should be noted that, all or some of the foregoing embodiments may be implemented by the wireless apparatus by using software, hardware, firmware, or any combination thereof.

Figure 9:
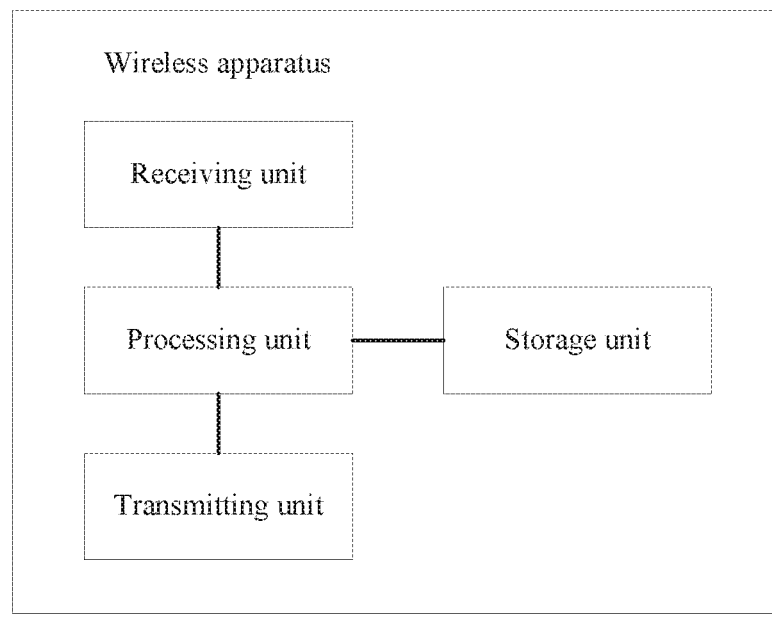
FIG. 9 shows a possible schematic structural diagram of a wireless apparatus according to an embodiment of the present disclosure.

In another optional manner of a structure of the wireless apparatus, a corresponding part in the foregoing embodiments may be implemented by corresponding hardware, or may be implemented by the corresponding hardware by executing corresponding software. For example, the receiver 301A may be hardware that has a function of executing the receiving function, such as a transceiver that integrates the sending and receiving functions or a receiver that implements only the receiving function, or may be a general processor or another hardware device that can execute a corresponding computer program to complete the foregoing functions, or may be a software module or a functional unit that executes a corresponding function, such as a receiving unit. For another example, the processor 304 may be hardware that is capable of executing the processor function, such as a processor with a specific function or a general processor, or may be another hardware device that can execute a corresponding computer program to complete the foregoing functions, or may be a software module or a functional unit that executes a corresponding function, such as a processing unit. For another example, the transmitter 301B may be hardware that has a function of executing the sending function, such as a transceiver that integrates the sending and receiving functions or a transmitter that implements only the transmitting function, or may be a general processor or another hardware device that can execute a corresponding computer program to complete the foregoing functions, or may be a software module or a functional unit that executes a corresponding function, such as a transmitting unit. Optionally, the wireless apparatus further includes a storage unit. For details, refer to FIG. 9.

The following provides a further description based on a possible structure of the network device in FIG. 2. The network device can execute any method in the embodiments of the present disclosure. The network device may include at least a controller or processor 201 (the following uses the processor 201 as an example for description) and a transceiver 202. Optionally, the network device may further include other components in FIG. 2 and the description about FIG. 2, such as a memory. Herein, the transceiver 202 may be constituted by an independent receiver and an independent transmitter, to separately execute corresponding receiving and sending functions; or may be a transceiver that integrates the receiving and sending functions. No further limitation is imposed herein. The transceiver 202 in FIG. 2 may be structurally split into a receiver 202A and a transmitter 202B. The network device is used only as an optional main body for a description as an example herein. The following provides a description by using a wireless apparatus as a main body. The wireless apparatus may be a unit, a chip, or a part included by the network device, or may be the network device itself.

The wireless apparatus includes a processor 201 and a transmitter 202B.

The processor is configured to determine a plurality of resource blocks, where the plurality of resource block units are for a terminal device.

The transmitter is configured to send resource indication information to the terminal device, where the resource indication information is used to indicate the plurality of resource blocks.

Optionally, the resource indication information includes S bits, and each of the S bits is used to indicate whether at least one resource block is for the terminal device.

Optionally, a $1^{st}$ bit in the S bits is used to indicate whether n consecutive resource blocks starting from a start resource block of a common index area are for the terminal device, and n is equal to m; or n is equal to y1; or n is equal to m minus y1; where y1 is equal to a first offset mod m, m is determined by the network device or preconfigured, the first offset is an offset between the start resource block of the common index area and a frequency domain reference point, and the frequency domain reference point is determined by the network device or preconfigured.

Optionally, the transmitter 202B is further configured to send the first offset to the terminal device.

Optionally, a $1^{st}$ bit in the S bits is used to indicate whether n consecutive resource blocks starting from a start resource block of a BWP are for the terminal device, or is used to indicate whether m resource blocks adjacent to n consecutive resource blocks starting from a start resource block of a BWP are for the terminal device; where n is equal to m minus y2, y2 is equal to the second offset mod m; or n is equal to y3 or equal to a difference between m and y3; and y3 is equal to a third offset mod m, the third offset is related to the first offset and the second offset, m is determined by the network device or preconfigured, the first offset is an offset between a start resource block of the common index area and a frequency domain reference point, the frequency domain reference point is determined by the network device or preconfigured, and the second offset is an offset between the start resource block of the common index area and the start resource block of the BWP.

Optionally, the transmitter 202B is further configured to send the second offset to the terminal device.

Optionally, the transmitter 202B sends offset indication information to the terminal device, where the offset indication information is used to indicate a quantity of RBs offset from a resource indication reference resource block to the start resource block of the common index area or the start resource block of the carrier BWP.

Further, optionally, the resource indication reference resource block may be a first RB or a last RB in the at least one resource block indicated by the $1^{st}$ bit in the resource indication information.

Optionally, a second bit in the S bits is used to indicate whether m resource blocks are for the terminal device, and the m resource blocks are adjacent, in a frequency domain, to n resource blocks indicated by the $1^{st}$ bit in the S bits.

Optionally, m is equal to 1, 2, 4, 8, 3, 6, or 12.

It should be noted that, for a specific implementation of a communication method executed by the wireless apparatus, refer to the description of the communication method provided in the embodiments of the present disclosure. The network device in this embodiment of the present disclosure and the communication method corresponding to FIG. 6 are based on a same idea, and technical effects brought by the network device are the same as those of the control resource obtaining method. Specific functions of the processor and the receiver included in the wireless apparatus in this embodiment of the present disclosure and any features, terms, and implementation details that are related to the specific functions are corresponding to the functions of the network device in the method embodiment corresponding to FIG. 6. For specific content, refer to the description of the method embodiment corresponding to FIG. 6 in the present disclosure. Details are not described herein again.

It should be noted that, all or some of the foregoing embodiments may be implemented by the wireless apparatus by using software, hardware, firmware, or any combination thereof.

In another optional manner of a structure of the wireless apparatus, a corresponding part in the foregoing embodiments may be implemented by corresponding hardware, or may be implemented by the corresponding hardware by executing corresponding software. For example, the transmitter 202B may be hardware that has a function of executing the sending function, such as a transceiver that integrates the sending and receiving functions or a transmitter that implements only the sending function, or may be a general processor or another hardware device that can execute a corresponding computer program to complete the foregoing functions, or may be a software module or a functional unit that executes a corresponding function, such as a transmitting unit. For another example, the processor 201 may be hardware that is capable of executing the processor function, such as a processor with a specific function or a general processor, or may be another hardware device that can execute a corresponding computer program to complete the foregoing functions, or may be a software module or a functional unit that executes a corresponding function, such as a processing unit. For another example, the receiver 202A may be hardware that has a function of executing the receiving function, such as a transceiver that integrates the sending and receiving functions or a receiver that implements only the receiving function, or may be a general processor or another hardware device that can execute a corresponding computer program to complete the foregoing functions, or may be a software module or a functional unit that executes a corresponding function, such as a receiving unit. Optionally, the wireless apparatus further includes a storage unit. For details, refer to FIG. 9.

It can be understood that, the accompanying drawings show only a simplified design of the wireless apparatus. In an actual application, the wireless apparatus may include any quantities of transmitters, receivers, processors, controllers, memories, communication units, and the like.

An embodiment of the present disclosure further provides a communication system, including at least one network device and at least one terminal device described for executing the embodiments of the present disclosure.

An embodiment of the present disclosure further provides an apparatus (for example, an integrated circuit, a wireless device, and a circuit module), configured to implement the foregoing communication method. An apparatus for implementing a power tracker and/or a power generator described in this specification may be a standalone device or may be a part of a larger device. The device may be (i) a standalone IC; (ii) a set of one or more ICs, including a memory IC for storing data and/or an instruction; (iii) an RFIC, such as an RF receiver or an RF transmitter/receiver; (iv) an ASIC, such as a mobile station modem; (v) a module that can be built into other devices; (vi) a receiver, a cellular phone, a wireless device, a handheld phone, or a mobile unit; (vii) others.

The method and the apparatus provided in the embodiments of the present disclosure may be applied to the terminal device or the network device (which may be collectively referred to as a wireless device). The terminal device or the network device or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing in a process, such as a Linux operating system, a Unix operating system, an Android operating system, an iOS operating system, or a Windows operating system. The application layer includes applications such as a browser, an address book, text processing software, and instant messaging software. In addition, a specific structure of a method execution body is not limited in the embodiments of the present disclosure, provided that the method execution body can perform communication based on the signal transmission method in the embodiments of the present disclosure by running a program that records code of the method in the embodiments of the present disclosure. For example, the wireless communication method in the embodiments of the present disclosure may be performed by the terminal device, or the network device, or a function module that is in the terminal device or the network device and that can call and execute a program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

In addition, aspects or features in the embodiments of the present disclosure may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

All or some of the foregoing embodiments may be implemented by using software, hardware, firmware, or any combination thereof. When software is used to implement the embodiments, the embodiments may be implemented fully or partially in a form of a computer program product. The computer program product includes one or more computer instructions. When the computer program instructions are loaded and executed on the computer, the procedure or functions of the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a Solid State Disk (SSD)), or the like.

It should be understood that numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
   determining, by a network device, frequency domain resources in a control resource set;
   sending, by the network device, resource indication information to a terminal device, wherein the resource indication information indicates the frequency domain resources, the resource indication information comprising S bits, S being a positive integer, wherein:
   a most significant bit (MSB) in the S bits indicates whether a resource block set belongs to the frequency domain resources in the control resource set for the terminal device, and
   the resource block set consists of m consecutive resource blocks within a bandwidth part (BWP),
      when y2 is unequal to 0, the m consecutive resource blocks being adjacent to n consecutive resource blocks starting from a start resource block of the BWP, the n consecutive resource blocks not belonging to the control resource set for the terminal device, wherein:
         n is greater than zero,
         m is a positive integer, and
         n<m, wherein n is equal to m minus y2, wherein y2 is equal to a second offset mod m, and the second offset is an offset between a start resource block of a common index area and the start resource block of the BWP,
      when y2 is equal to 0, the m consecutive resource blocks starting from a start resource block of the BWP, wherein y2 is equal to a second offset mod m, the second offset is an integer multiple of m, and the second offset is an offset between a start resource block of a common index area and the start resource block of the BWP.

2. The method according to claim 1, wherein the common index area further comprises one or more bandwidth parts (BWPs).

3. The method according to claim 1, wherein the resource block set indicated by the MSB is a first resource block set, and wherein:
   a second most significant bit in the S bits indicates whether a second resource block set consists of m consecutive resource blocks belong to the frequency domain resources in the control resource set for the terminal device, and the m consecutive resource blocks in the second resource block set are adjacent to the m consecutive resource blocks in the first resource block set, and S>1.

4. The method according to claim 1, wherein:
when the resource block set consists of m consecutive resource blocks starting from the start resource block of the BWP, S satisfies $S=\lfloor (X2-m)/m \rfloor +1$; or
when the resource block set consists of the m consecutive resource blocks adjacent to the n consecutive resource blocks starting from the start resource block of the BWP, S satisfies $S=\lfloor (X2-n)/m \rfloor$,
wherein $\lfloor \ \rfloor$ indicates rounding-down, and X2 is a quantity of resource blocks in the BWP.

5. The method according to claim 1, wherein the resource indication information provides a bitmap.

6. The method according to claim 1, wherein m is 6.

7. The method according to claim 1, wherein each of the S bits corresponds to one resource block set, and each of the S bits indicates whether a corresponding resource block set in the BWP belongs to the frequency domain resources in the control resource set.

8. A wireless apparatus, comprising:
one or more processors; and
a memory, wherein the memory stores instructions, and when executing the instructions stored in the memory, the one or more processors executes operations comprising:
determining frequency domain resources in a control resource set; and
sending resource indication information to a terminal device, wherein the resource indication information indicates the frequency domain resources, the resource indication information comprising S bits, S being a positive integer, wherein:
a most significant bit (MSB) in the S bits indicates whether a resource block set belongs to the frequency domain resources in the control resource set for the terminal device, and
the resource block set consists of m consecutive resource blocks within a bandwidth part (BWP),
when y2 is unequal to 0, the m consecutive resource blocks being adjacent to n consecutive resource blocks starting from a start resource block of the BWP, wherein:
n<m, wherein n is equal to m minus y2, wherein y2 is equal to a second offset mod m, and the second offset is an offset between a start resource block of a common index area and the start resource block of the BWP,
when y2 is equal to 0, the m consecutive resource blocks starting from a start resource block of the BWP, wherein y2 is equal to a second offset mod m, the second offset is an integer multiple of m, and the second offset is an offset between a start resource block of a common index area and the start resource block of the BWP.

9. The apparatus according to claim 8, wherein the common index area further comprises one or more bandwidth parts (BWPs).

10. The apparatus according to claim 8, wherein the resource block set indicated by the MSB is a first resource block set, and wherein:
a second most significant bit in the S bits indicates whether a second resource block set consists of m consecutive resource blocks belong to the frequency domain resources in the control resource set for the terminal device, and
the m consecutive resource blocks in the second resource block set being adjacent to the m consecutive resource blocks in the first resource block set, and S>1.

11. The apparatus according to claim 8, wherein:
when the resource block set consists of m consecutive resource blocks starting from the start resource block of the BWP, S satisfies $S=\lfloor (X2-m)/m \rfloor +1$; or
when the resource block set consists of the m consecutive resource blocks adjacent to the n consecutive resource blocks starting from the start resource block of the BWP, S satisfies $S=\lfloor (X2-n)/m \rfloor$,
wherein $\lfloor \ \rfloor$ indicates rounding-down, and X2 is a quantity of resource blocks in the BWP.

12. The apparatus according to claim 8, wherein the resource indication information provides a bitmap.

13. The apparatus according to claim 8, wherein m is 6.

14. The apparatus according to claim 8, wherein each of the S bits corresponds to one resource block set, and each of the S bits indicates whether a corresponding resource block set in the BWP belongs to the frequency domain resources in the control resource set.

15. A non-transitory computer-readable storage medium storing instructions that, when executed by at least one processor, cause a network device to perform operations comprising:
determining frequency domain resources in a control resource set; and
sending resource indication information to a terminal device, wherein the resource indication information indicates the frequency domain resources, the resource indication information comprising S bits, S being a positive integer, wherein:
a most significant bit (MSB) in the S bits indicates whether a resource block set belongs to the frequency domain resources in the control resource set for the terminal device, and
the resource block set consists of m consecutive resource blocks within a bandwidth part (BWP),
when y2 is unequal to 0, the m consecutive resource blocks being adjacent to n consecutive resource blocks starting from a start resource block of the BWP, the n consecutive resource blocks not belonging to the control resource set for the terminal device, wherein:
n is greater than zero,
m is a positive integer, and
n<m, wherein n is equal to m minus y2, wherein y2 is equal to a second offset mod m, and the second offset is an offset between a start resource block of a common index area and the start resource block of the BWP,
when y2 is equal to 0, the m consecutive resource blocks starting from a start resource block of the BWP, wherein y2 is equal to a second offset mod m, the second offset is an integer multiple of m, and the second offset is an offset between a start resource block of a common index area and the start resource block of the BWP.

16. The non-transitory computer-readable storage medium according to claim 15, wherein the common index area further comprises one or more bandwidth parts (BWPs).

17. The non-transitory computer-readable storage medium according to claim 15, wherein the resource block set indicated by the MSB is a first resource block set, and wherein:
a second most significant bit in the S bits indicates whether a second resource block set consists of m consecutive resource blocks belong to the frequency domain resources in the control resource set for the terminal device, and the m consecutive resource blocks in the second resource block set being adjacent to the m consecutive resource blocks in the first resource block set, and S>1.

18. The non-transitory computer-readable storage medium according to claim 15, wherein:

when the resource block set consists of m consecutive resource blocks starting from the start resource block of the BWP, S satisfies $S=\lfloor(X2-m)/m\rfloor+1$; or when the resource block set consists of the m consecutive resource blocks adjacent to the n consecutive resource blocks starting from the start resource block of the BWP, S satisfies $S=\lfloor(X2-n)/m\rfloor$, wherein $\lfloor\ \rfloor$ indicates rounding-down, and X2 is a quantity of resource blocks in the BWP.

19. The non-transitory computer-readable storage medium according to claim 15, wherein the resource indication information provides a bitmap.

20. The non-transitory computer-readable storage medium according to claim 15, wherein m is 6.

21. The non-transitory computer-readable storage medium according to claim 15, wherein each of the S bits corresponds to one resource block set, and each of the S bits indicates whether a corresponding resource block set in the BWP belongs to the frequency domain resources in the control resource set.

* * * * *